United States Patent
Takano

(10) Patent No.: US 10,454,539 B2
(45) Date of Patent: Oct. 22, 2019

(54) BEAMFORMING DEVICE FOR PROVIDING WEIGHT SETS

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 77 days.

(21) Appl. No.: 15/307,604

(22) PCT Filed: Apr. 28, 2015

(86) PCT No.: PCT/JP2015/062896
§ 371 (c)(1),
(2) Date: Oct. 28, 2016

(87) PCT Pub. No.: WO2015/170651
PCT Pub. Date: Nov. 12, 2015

(65) Prior Publication Data
US 2017/0126292 A1    May 4, 2017

(30) Foreign Application Priority Data

May 8, 2014  (JP) .................................. 2014-096868

(51) Int. Cl.
*H04B 7/0417* (2017.01)
*H04B 7/06* (2006.01)
(Continued)

(52) U.S. Cl.
CPC ............. *H04B 7/0421* (2013.01); *H04B 7/06* (2013.01); *H04B 7/0617* (2013.01);
(Continued)

(58) Field of Classification Search
CPC ...... H04B 17/318; H04B 7/0421; H04B 7/06; H04B 7/0617; H04J 11/00; H04J 1/00;
(Continued)

(56) References Cited

U.S. PATENT DOCUMENTS

| | | |
|---|---|---|
| 2011/0116437 A1 | 5/2011 | Chen et al. |
| 2012/0008522 A1 | 1/2012 | Ng |

(Continued)

FOREIGN PATENT DOCUMENTS

| | | |
|---|---|---|
| JP | 2011-4056 A | 1/2011 |
| JP | 2011-142406 A | 7/2011 |

(Continued)

OTHER PUBLICATIONS

Huawei, "CSI-RS design to support multiple-cell measurement," 3GPP TSG RAN WG1 meeting #60, Feb. 22-26, 2010.*

(Continued)

*Primary Examiner* — Kashif Siddiqui
(74) *Attorney, Agent, or Firm* — Xsensus LLP

(57) ABSTRACT

[Object] To enable a cell appropriate for a terminal device to be selected when beamforming is performed.
[Solution] Provided is a device including: an acquisition unit configured to acquire multiple weight sets for beamforming; and a control unit configured to map a reference signal for measurement to radio resources associated with a weight set in advance for each weight set included in the multiple weight sets, and multiply the reference signal by the weight set.

30 Claims, 25 Drawing Sheets

(51) Int. Cl.

| | | |
|---|---|---|
| *H04J 1/00* | (2006.01) | |
| *H04J 11/00* | (2006.01) | |
| *H04W 4/06* | (2009.01) | |
| *H04W 16/28* | (2009.01) | |
| *H04W 24/08* | (2009.01) | |
| *H04W 72/04* | (2009.01) | |
| *H04B 17/318* | (2015.01) | |
| *H04L 5/00* | (2006.01) | |
| *H04L 12/18* | (2006.01) | |

(52) U.S. Cl.
CPC .............. *H04B 17/318* (2015.01); *H04J 1/00* (2013.01); *H04J 11/00* (2013.01); *H04L 5/0051* (2013.01); *H04W 4/06* (2013.01); *H04W 16/28* (2013.01); *H04W 24/08* (2013.01); *H04W 72/04* (2013.01); *H04W 72/0446* (2013.01); *H04L 12/189* (2013.01)

(58) Field of Classification Search
CPC .... H04L 12/189; H04L 5/0051; H04W 16/28; H04W 24/08; H04W 4/06; H04W 72/04; H04W 72/0446
See application file for complete search history.

(56) References Cited

U.S. PATENT DOCUMENTS

| | | | |
|---|---|---|---|
| 2012/0300653 A1 | 11/2012 | Kishiyama et al. | |
| 2012/0314808 A1* | 12/2012 | Taoka | H04B 7/0452 375/299 |
| 2013/0301439 A1* | 11/2013 | Heo | H04W 4/90 370/252 |
| 2014/0112253 A1* | 4/2014 | Nagata | H04L 5/0023 370/328 |
| 2015/0049623 A1* | 2/2015 | Yuk | H04W 36/30 370/252 |
| 2015/0222340 A1* | 8/2015 | Nagata | H04W 16/28 375/267 |
| 2016/0050006 A1* | 2/2016 | Ko | H04B 17/00 370/329 |
| 2017/0163320 A1* | 6/2017 | Nagata | H04B 7/0413 |

FOREIGN PATENT DOCUMENTS

| | | |
|---|---|---|
| JP | 2012-231493 A | 11/2012 |
| JP | 2013-511896 A | 4/2013 |
| JP | 2014-30135 A | 2/2014 |
| JP | 2014-53811 A | 3/2014 |

OTHER PUBLICATIONS

Weight function. https://en.wikipedia.org/wiki/Weight_function. Accessed on Sep. 10, 2018 (Year: 2018).*
International Search Report dated Jul. 21, 2015 in PCT/JP2015/062896 filed Apr. 28, 2015.

* cited by examiner

● ANTENNA ELEMENT

FIG. 15
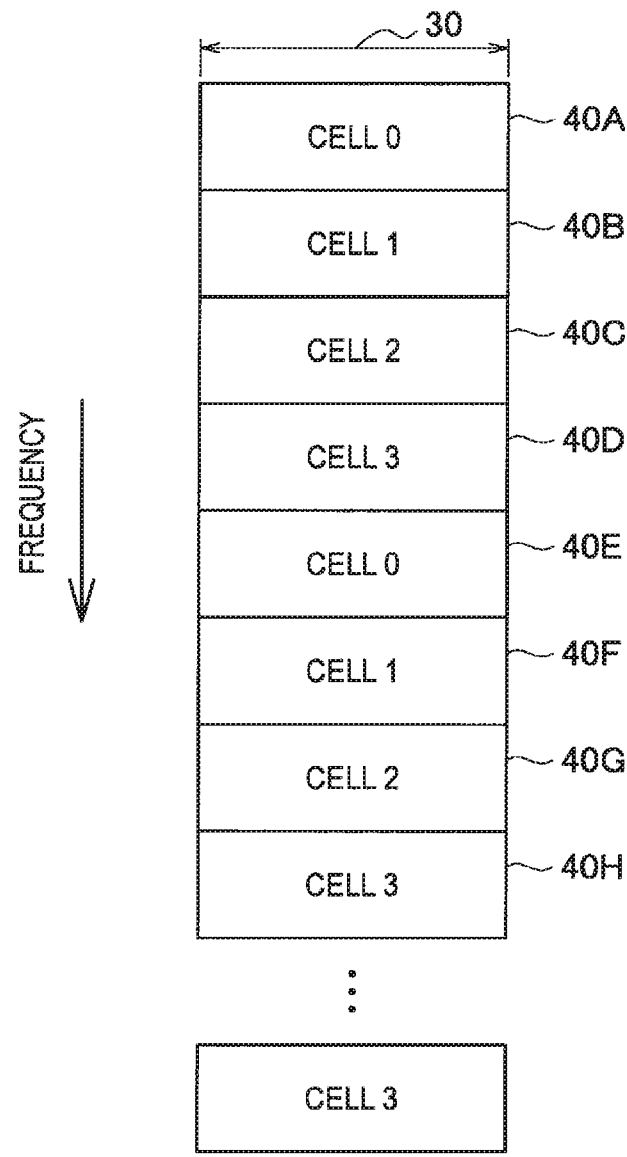
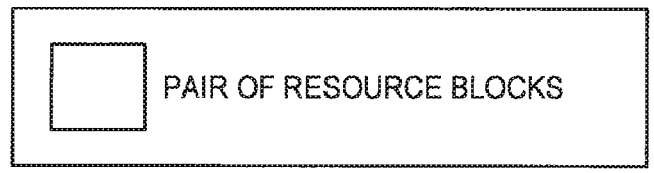

BEAMFORMING DEVICE FOR PROVIDING WEIGHT SETS

TECHNICAL FIELD

The present disclosure relates to a device.

BACKGROUND ART

Currently, in the Third Generation Partnership Project (3GPP), in order to accommodate explosively increasing traffic, various technologies for increasing the capacity of cellular systems are being investigated. In the future, it is predicted that a capacity of about 1000 times the current capacity will be necessary. Technologies such as multi-user multi-input multiple-input multiple-output (MU-MIMO) and coordinated multipoint (CoMP) are considered to increase the capacity of cellular systems to only about several times the previous capacity. Therefore, a breakthrough technique is necessary.

For example, as a technique for significantly increasing the capacity of cellular systems, a base station that uses a directional antenna including multiple antenna elements (for example, about 100 antenna elements) and performs beamforming is considered. Such technology is a form of technology called large-scale MIMO or massive MIMO. According to such beamforming, a half width of a beam becomes narrower. That is, a sharp beam is formed. In addition, when the multiple antenna elements are arranged on a plane, it is also possible to form a beam in a desired three-dimensional direction.

Various beamforming technologies are proposed. For example, in Patent Literature 1, technology for implementing beamforming by a base station even when frequency bands of an upstream channel and a downstream channel are different is disclosed.

CITATION LIST

Patent Literature

Patent Literature 1 JP 2011-004056A

SUMMARY OF INVENTION

Technical Problem

However, there is a possibility of an appropriate cell for a terminal device not being selected when beamforming is performed.

Specifically, selection of a cell for a terminal device (for example, cell selection/cell reselection by a terminal device and handover decision by a base station) is normally performed based on a result of measurement of a cell-specific reference signal (CRS) that is transmitted without beamforming. Therefore, a cell selected as a result is a cell that is good for receiving a signal transmitted without beamforming but is not necessarily a cell that is good for receiving a signal transmitted with beamforming. Therefore, there is a possibility of an appropriate cell for a terminal device not being selected when beamforming is performed. This may be especially noticeable when a directional antenna including multiple antenna elements is used to perform the beamforming.

Therefore, it is preferable to provide a mechanism in which a cell appropriate for a terminal device can be selected when beamforming is performed.

Solution to Problem

According to the present disclosure, there is provided a device including: an acquisition unit configured to acquire multiple weight sets for beamforming; and a control unit configured to map a reference signal for measurement to radio resources associated with a weight set in advance for each weight set included in the multiple weight sets, and multiply the reference signal by the weight set.

According to the present disclosure, there is provided a device including: an acquisition unit configured to acquire a result of measurement of a reference signal for measurement transmitted using radio resources associated with a weight set for each weight set included in multiple weight sets for beamforming, the reference signal being multiplied by the weight set, and a reporting unit configured to perform measurement reporting to a base station based on the result of the measurement.

Advantageous Effects of Invention

As described above, according to the present disclosure, it is possible to select a cell appropriate for a terminal device when beamforming is performed. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 15 is an explanatory diagram for describing a second example of a relation between radio resources associated with a weight set in advance and radio resources used by an adjacent base station.

DESCRIPTION OF EMBODIMENT(S)

Figure 1:
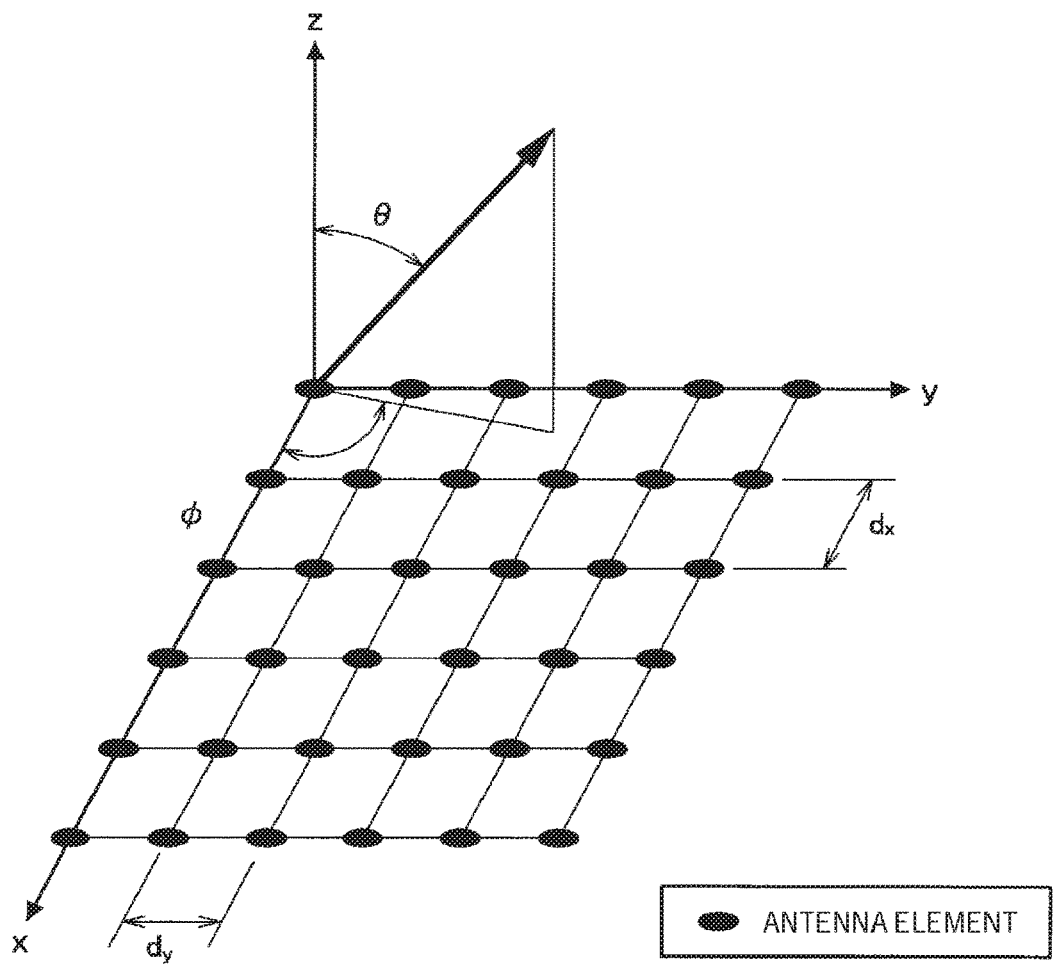
FIG. 1 is an explanatory diagram for describing a weight set for large-scale MIMO beamforming.

Hereinafter, preferred embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as terminal devices 200A, 200B and 200C as necessary. On the other hand, when none of the multiple elements having substantially the same function and structure is particularly distinguished, only the same sign will be given. For example, the terminal devices 200A, 200B and 200C will be simply designated as the terminal device 200 when not particularly distinguished.

The description will proceed in the following order.
1. Introduction
2. Schematic configuration of communication system
3. Configuration of devices
3.1. Configuration of base station
3.2. Configuration of terminal device
4. Process flow
5. Modification examples
5.1. First modification example
5.2. Second modification example
5.3. Third modification example
6. Application examples
6.1. Application examples of base station
6.2. Application examples of terminal device
7. Conclusion <<1. Introduction>>

First, beamforming, measurement and cell selection will be described with reference to FIG. 1 and FIG. 2.

(Beamforming)

(a) Necessity of Large-scale MIMO

Currently, in the 3GPP, in order to accommodate explosively increasing traffic, various technologies for increasing the capacity of cellular systems are being investigated. In the future, it is predicted that a capacity of about 1000 times the current capacity will be necessary. Technologies such as MU-MIMO and CoMP are considered to increase the capacity of cellular systems to only about several times the previous capacity. Therefore, a breakthrough technique is necessary.

In 3GPP release 10, an eNodeB in which eight antennas are implemented is standardized. According to the antennas, MIMO of eight layers can be implemented in single-user multi-input multiple-input multiple-output (SU-MIMO). 8-layer MIMO is technology in which eight independent streams are spatially multiplexed. In addition, it is possible to implement MU-MIMO of two layers with four users.

In a user equipment (UE), due to a small space for arranging antennas and a limited UE processing capacity, it is difficult to increase the number of antenna elements of an antenna of the UE. However, according to the recent advances in antenna mounting technology, it is possible to arrange a directional antenna including about 100 antenna elements in an eNodeB.

For example, as a technique for significantly increasing the capacity of cellular systems, a base station that uses a directional antenna including multiple antenna elements (for example, about 100 antenna elements) and performs beamforming is considered. Such technology is a form of technology called large-scale MIMO or massive MIMO. According to such beamforming, a half width of a beam becomes narrower. That is, a sharp beam is formed. In addition, when the multiple antenna elements are arranged on a plane, it is also possible to form a beam in a desired three-dimensional direction. For example, a technique in which a beam directed to a position higher than a base station (for example, an upper floor of a high-rise building) is formed, and thus a signal is transmitted to a terminal device in the position is proposed.

In typical beamforming, it is possible to change a direction of a beam in a horizontal direction. Therefore, the typical beamforming may be referred to as two-dimensional beamforming. On the other hand, in large-scale MIMO (or massive MIMO) beamforming, it is possible to change a direction of a beam in a vertical direction in addition to the horizontal direction. Therefore, the large-scale MIMO beamforming may be referred to as three-dimensional beamforming.

Since the number of antennas increases, it is possible to increase the number of users of MU-MIMO. Such technology is another form of technology called large-scale MIMO or massive MIMO. When the number of antennas of a UE is 2, the number of streams that are spatially independent in one UE is 2. Therefore, increasing the number of users of MU-MIMO is more reasonable than increasing the number of streams in one UE.

(b) Weight Set

A weight set for beamforming (that is, a set of weight coefficients for multiple antenna elements) is represented as a complex number. Hereinafter, an example of a weight set for large-scale MIMO beamforming will be described specifically with reference to FIG. 1.

FIG. 1 is an explanatory diagram for describing a weight set for large-scale MIMO beamforming. Referring to FIG. 1, antenna elements arranged in a grid pattern are shown. In addition, two orthogonal axes x and y on a plane in which antenna elements are arranged and one axis z orthogonal to the plane are shown. Here, a direction of a beam to be formed is indicated by, for example, an angle phi (Greek letter) and an angle theta (Greek letter). The angle phi (Greek letter) is an angle formed by a component of an xy plane within a beam direction and an x axis. In addition, the angle theta (Greek letter) is an angle formed by a beam direction and a z axis. In this case, for example, a weight coefficient $V_{m,n}$ of an antenna element that is arranged at an m-th point in an x axis direction and arranged at an n-th point in a y axis direction may be represented as follows.

$$V_{m,n}(\theta, \varphi, f) = \exp\left(j2\pi\frac{f}{c}\{(m-1)d_x\sin(\theta)\cos(\varphi) + (n-1)d_y\sin(\theta)\sin(\varphi)\}\right)$$ [Math. 1]

f denotes a frequency and c denotes the speed of light. j denotes an imaginary unit of a complex number. $d_x$ denotes an interval between antenna elements in an x axis direction. $d_y$ denotes an interval between antenna elements in a y axis direction. Coordinates of the antenna element are represented as follows.

$$x=(m-1)d_x, y=(n-1)d_y$$ [Math. 2]

A weight set for typical beamforming (two-dimensional beamforming) may be decomposed into a weight set for forming a beam in a desired horizontal direction and a weight set for adjusting transfer between antennas. Therefore, a weight set for large-scale MIMO beamforming may be decomposed into a first weight set for forming a beam in a desired vertical direction, a second weight set for forming a beam in a desired horizontal direction and a third weight set for adjusting transfer between antennas.

(c) Change of an Environment According to Large-scale MIMO Beamforming

When large-scale MIMO beamforming is performed, a gain reaches 10 dB or more. A change of a radio wave environment of a cellular system using the beamforming may be greater than a cellular system of the related art.

(d) Case in which Large-scale MIMO Beamforming is Performed

For example, a base station of an urban area forming a beam directed to a high-rise building is considered. In addition, even in a suburb, a base station of a small cell is considered to form a beam directed to an area around the base station. A base station of a suburban macro cell is unlikely to perform large-scale MIMO beamforming.

(Measurement)

(a) Measurement of a CRS

In Long-Term Evolution (LTE), a terminal device performs measurement of a cell-specific reference signal (CRS) transmitted by a base station. Specifically, the terminal device receives a CRS transmitted by the base station and performs measurement of quality of a propagation path between the base station and the terminal device. The measurement is referred to as "radio resource management (RRM) measurement," or simply referred to as "measurement."

A result of the measurement is used to select a cell for a terminal device. Specifically, for example, the result of the measurement is used for cell selection/cell reselection by a terminal device that is in a radio resource control (RRC) idle (RRC idle) state. In addition, for example, the result of the measurement is reported to a base station by a terminal device that is in an RRC connected state and is used for handover decision by the base station.

As described above, the measurement is performed by receiving a CRS. Since the CRS is a signal for measuring quality of a transmission path of omnidirectional radio waves, it is transmitted without beamforming. That is, the CRS is transmitted without multiplying a weight set for beamforming.

There is a reference signal for demodulation called a demodulation reference signal (DM-RS) or a UE-specific reference signal. Since the reference signal for demodulation is multiplied by a weight set for beamforming, it is not preferable to measure quality of a transmission path of omnidirectional radio waves. In addition, there is a reference signal called a channel state information reference signal (CSI-RS). Similarly to the CRS, the CSI-RS is transmitted without beamforming. However, since a transmission frequency of the CSI-RS is low, measurement by receiving the CSI-RS consumes much time. Hereinafter, a relation between multiplication of a weight coefficient and insertion (or mapping) of a reference signal will be described with reference to FIG. 2.

Figure 2:
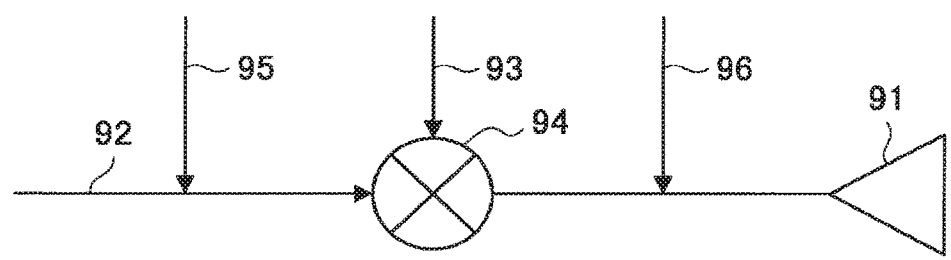
FIG. 2 is an explanatory diagram for describing a relation between multiplication of a weight coefficient and insertion of a reference signal.

FIG. 2 is an explanatory diagram for describing a relation between multiplication of a weight coefficient and insertion of a reference signal. Referring to FIG. 2, a transmission signal 92 corresponding to each antenna element 91 is complex-multiplied by a weight coefficient 93 in a multiplier 94. Then, the transmission signal 92 complex-multiplied by the weight coefficient 93 is transmitted from the antenna element 91. In addition, a DR-MS 95 is inserted before the multiplier 94, and the weight coefficient 93 is complex-multiplied in the multiplier 94. Then, the DR-MS 95 complex-multiplied by the weight coefficient 93 is transmitted from the antenna element 91. On the other hand, a CRS 96 (and CSI-RS) is inserted after the multiplier 94. Then, the CRS 96 (and CSI-RS) is transmitted from the antenna element 91 without being multiplied by the weight coefficient 93.

(b) RSRP and RSRQ

In LTE, measurement of a CRS is measurement of reference signal received power (RSRP) and/or reference signal received quality (RSRQ). In other words, a terminal device acquires RSRP and/or RSRQ as a result of the measurement of the CRS. The RSRQ is calculated from the RSRP and a received signal strength indicator (RSSI).

The RSRP is reception power of a CRS for each single resource element. That is, the RSRP is an average value of reception power of the CRS. The reception power of the CRS is obtained by detecting a correlation between a reception signal in a resource element of the CRS and a known signal CRS. The RSRP corresponds to a desired signal "Signal (S)."

The RSSI is total power of signals for each Orthogonal Frequency Division Multiple Access (OFDMA) symbol. Therefore, the RSSI includes a desired signal, an interference signal and noise. That is, the RSSI corresponds to "Signal (S)+Interference (I)+Noise (N)."

The RSRQ is RSRP/(RSSI/N). N denotes the number of resource blocks used for calculating an RSSI. The resource blocks are resource blocks that are arranged in a frequency direction. Therefore, the RSRQ is a value that is obtained by dividing the RSRP using the RSSI for each resource block. That is, the RSRQ corresponds to a signal-to-interference-plus-noise ratio (SINR).

As described above, according to the measurement of the CRS, reception power (that is, RSRP) and reception quality (that is, RSRQ) such as an SINR are obtained.

(c) Effect of Averaging

In order to acquire the RSRP and the RSRQ, it is necessary to receive signals for several milliseconds to several tens of milliseconds and perform averaging of reception power. This is because, when the RSRP and the RPRQ are acquired by averaging only one slot or one subset, the result is likely to be influenced by an instantaneous variation of a channel such as fading.

A technique of the averaging is implemented for each terminal device and is not specifically defined in the specification.

(Cell Selection)

(a) Example of Cell Selection

For example, when a terminal device is in an RRC idle state, cell selection/cell reselection is performed. That is, the terminal device selects a cell for performing communication (for example, a cell for receiving paging).

In addition, for example, a base station performs handover decision. That is, the base station selects a target cell for the terminal device and decides handover from a serving cell for the terminal device to the target cell.

In addition, for example, the base station adds a secondary cell (Scell) of carrier aggregation. The Scell is also called a secondary component carrier (SCC).

Here, the term "cell" may refer to a communication area of the base station or a frequency band that the base station uses. In addition, the term "cell" may refer to a primary cell (Pcell) or an Scell of carrier aggregation. The Pcell is also called a primary component carrier (PCC). The Scell is also called a secondary component carrier (SCC).

(b) Cell Selection when Beamforming is Performed

As described above, in the form of the technology called large-scale MIMO or massive MIMO, the base station performs beamforming using a directional antenna including multiple antenna elements (for example, about 100 antenna elements). In this case, the base station can change a direction of a beam in not only a horizontal direction but also a vertical direction. Therefore, as an example, when the base station forms a beam directed to a position (for example, an upper floor of a high-rise building) higher than the base station, it is possible to increase throughput at a high position. As another example, when a small base station forms a beam toward a nearby area, it is possible to reduce interference with an adjacent base station.

Here, when transmission and reception of signals according to large-scale MIMO beamforming become a main flow, there is a question of whether cell selection may be performed based on the result of measurement of the CRS.

Specifically, only quality of a transmission path of omnidirectional radio waves can be understood from measurement of the CRS. However, a transmission path of omnidirectional radio waves is completely different from a transmission path of a sharp beam that is formed according to large-scale MIMO beamforming. Therefore, when transmission and reception of signals according to the beamforming are assumed, there is a possibility of an appropriate cell not being selected in cell selection based on the result of measurement of the CRS.

As an example, when a terminal device transmits and receives signals in a cell selected based on the result of measurement of the CRS, there is a possibility of a great amount of interference due to a sharp beam from an adjacent base station. As another example, even if a result of measurement of a CRS of a certain cell is better than a result of measurement of a CRS of another cell, when beamforming is performed, there is a possibility of communication quality of the other cell being better than communication quality of the certain cell.

As described above, there is a possibility of an appropriate cell for a terminal device not being selected when beamforming is performed.

(c) Case in which Measurement of a CRS is not Preferable

As described above, for example, large-scale MIMO beamforming is considered to be performed by a base station of an urban area or a base station of a small cell. Therefore, it is not preferable for such base stations to perform cell selection based on measurement of the CRS.

<<2. Schematic Configuration of Communication System>>

Figure 3:
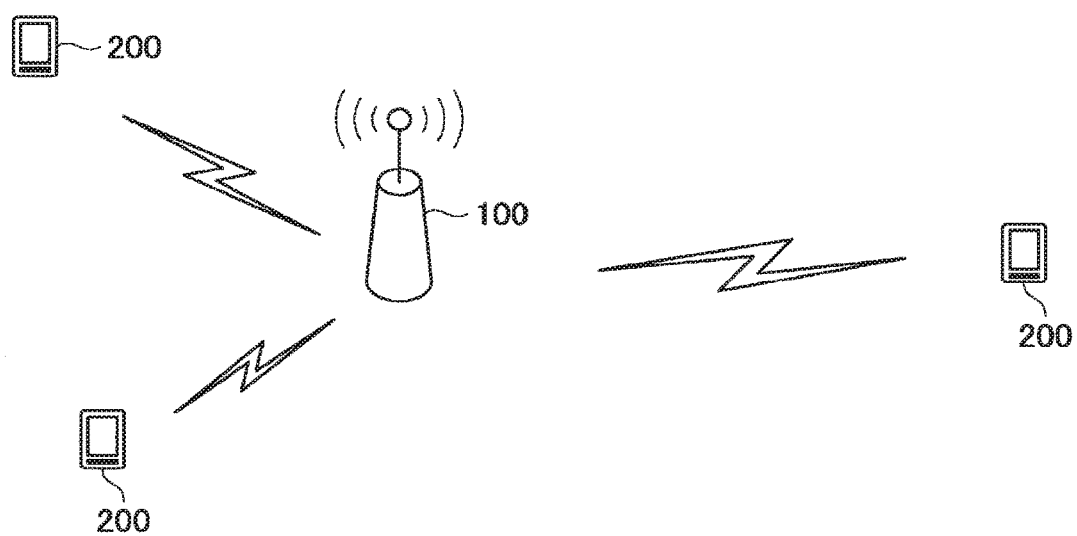
FIG. 3 is an explanatory diagram illustrating an example of a schematic configuration of a communication system according to an embodiment of the present disclosure.

Next, a schematic configuration of a communication system 1 according to an embodiment of the present disclosure will be described with reference to FIGS. 3 to 5. FIG. 3 is an explanatory diagram illustrating an example of the schematic configuration of the communication system 1 according to the embodiment of the present disclosure. Referring to FIG. 3, the communication system 1 includes a base station 100 and a terminal device 200. The communication system 1 is a system supporting, for example, LTE, LTE-Advanced, or a communication standard equivalent thereto.

The base station 100 wirelessly communicates with the terminal device 200. For example, the base station 100 wirelessly communicates with the terminal device 200 that is positioned within a communication area of the base station 100. In other words, when the terminal device 200 is positioned within the communication area of the base station 100, the terminal device 200 wirelessly communicates with the base station 100.

Specifically, in the embodiment of the present disclosure, the base station 100 performs beamforming. For example, the beamforming is large-scale MIMO beamforming. The beamforming may also be referred to as massive MIMO beamforming or three-dimensional beamforming.

Specifically, for example, the base station 100 includes a directional antenna available for large-scale MIMO. In addition, the base station 100 multiplies a transmission signal by a weight set for the directional antenna and thus performs large-scale MIMO beamforming. For example, the weight set is decided for each terminal device 200. As a result, a beam directed to the terminal device 200 is formed. Hereinafter, an example of large-scale MIMO beamforming will be described with reference to FIG. 4 and FIG. 5.

Figure 4:
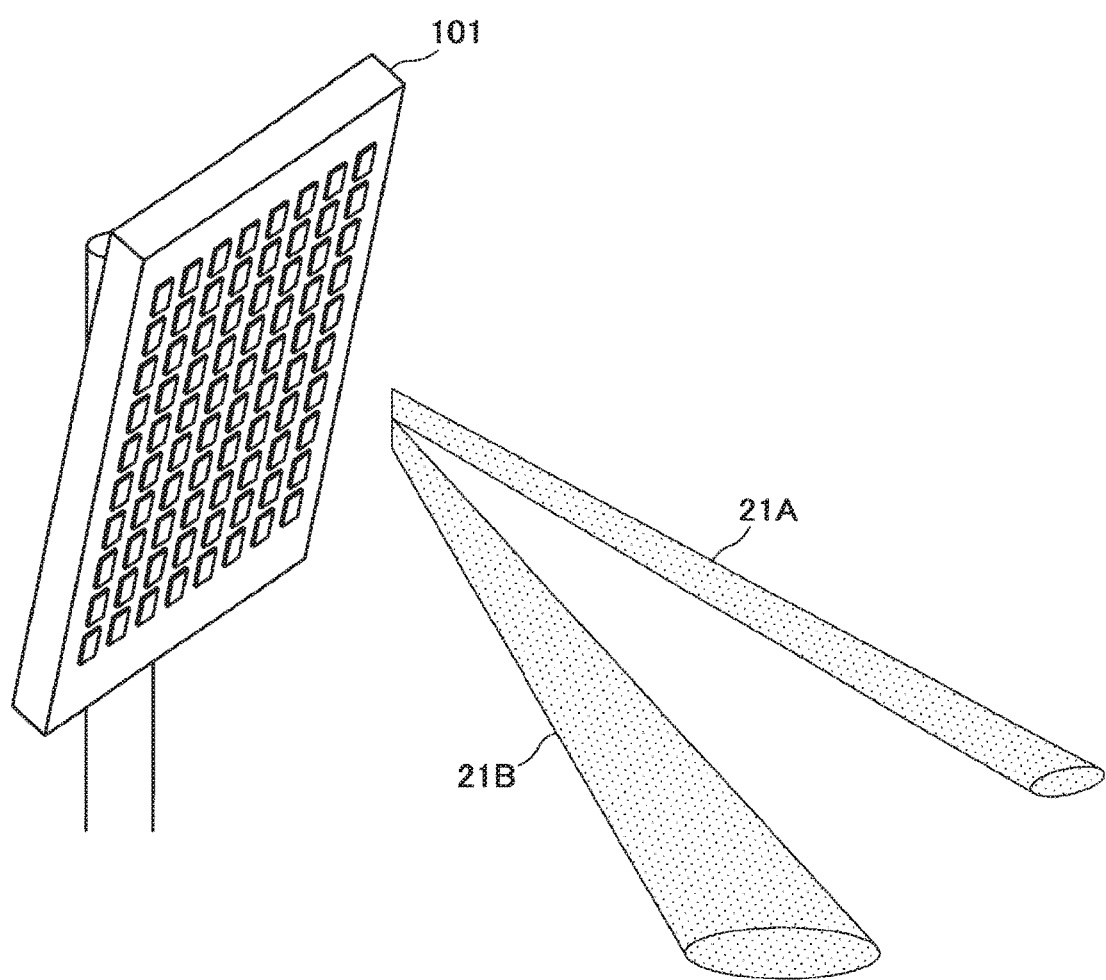
FIG. 4 is a first explanatory diagram for describing an example of large-scale MIMO beamforming.

FIG. 4 is a first explanatory diagram for describing an example of large-scale MIMO beamforming. Referring to FIG. 4, a directional antenna 101 available for large-scale MIMO is shown. The directional antenna 101 can form a sharp beam in a desired three-dimensional direction. For example, a beam 21A and a beam 21B are formed by the directional antenna 101.

Figure 5:
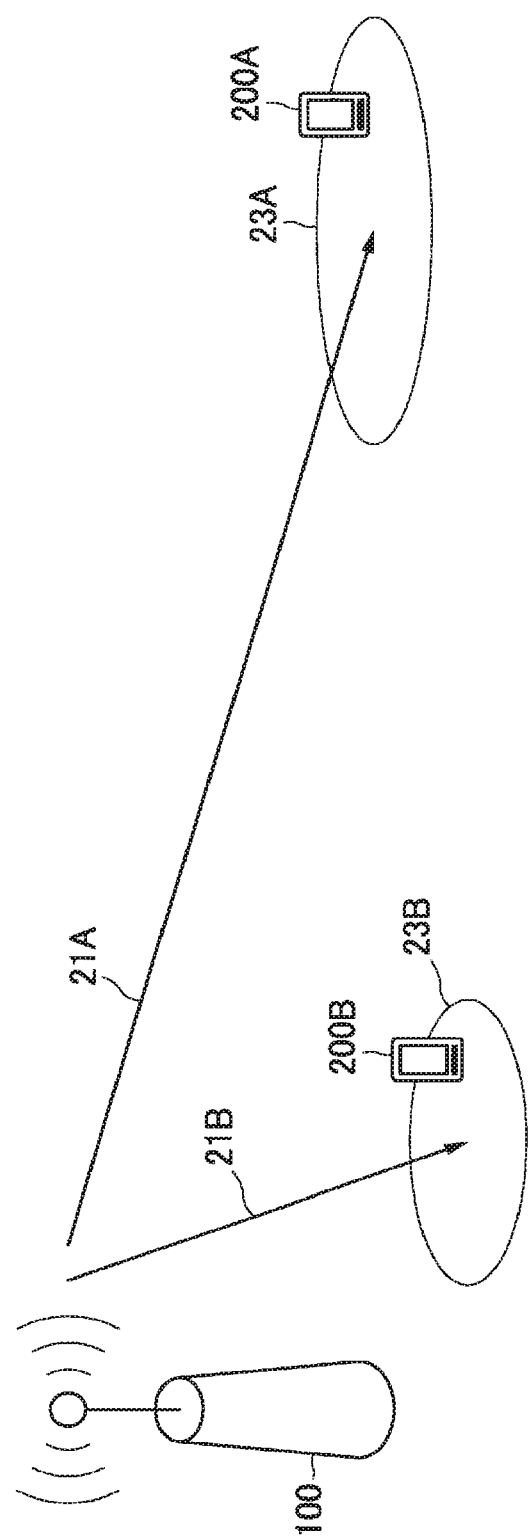
FIG. 5 is a second explanatory diagram for describing an example of large-scale MIMO beamforming.

FIG. 5 is a secondary explanatory diagram for describing an example of large-scale MIMO beamforming. Referring to FIG. 5, the beams 21A and 21B described with reference to FIG. 4 are shown. For example, the beam 21A reaches an area 23A and the beam 21B reaches an area 23B. Therefore, the terminal device 200A positioned within the area 23A can receive a signal transmitted as the beam 21A. In addition, the terminal device 200B positioned within the area 23B can receive a signal transmitted as the beam 21B. The base station 100 transmits a signal addressed to the terminal device 200A as the beam 21A and transmits a signal addressed to the terminal device 200B as the beam 21B.

The base station 100 can transmit, for example, a signal without beamforming. As an example, the base station 100 includes an omnidirectional antenna and transmits a signal as omnidirectional radio waves. As another example, the base station 100 includes a sector antenna, and may transmit a signal as a sector beam.

<<3. Configuration of Devices>>

Next, configurations of the base station 100 and the terminal device 200 according to an embodiment of the present disclosure will be described with reference to FIG. 6 to FIG. 12.

<3.1. Configuration of Base Station>

Figure 6:
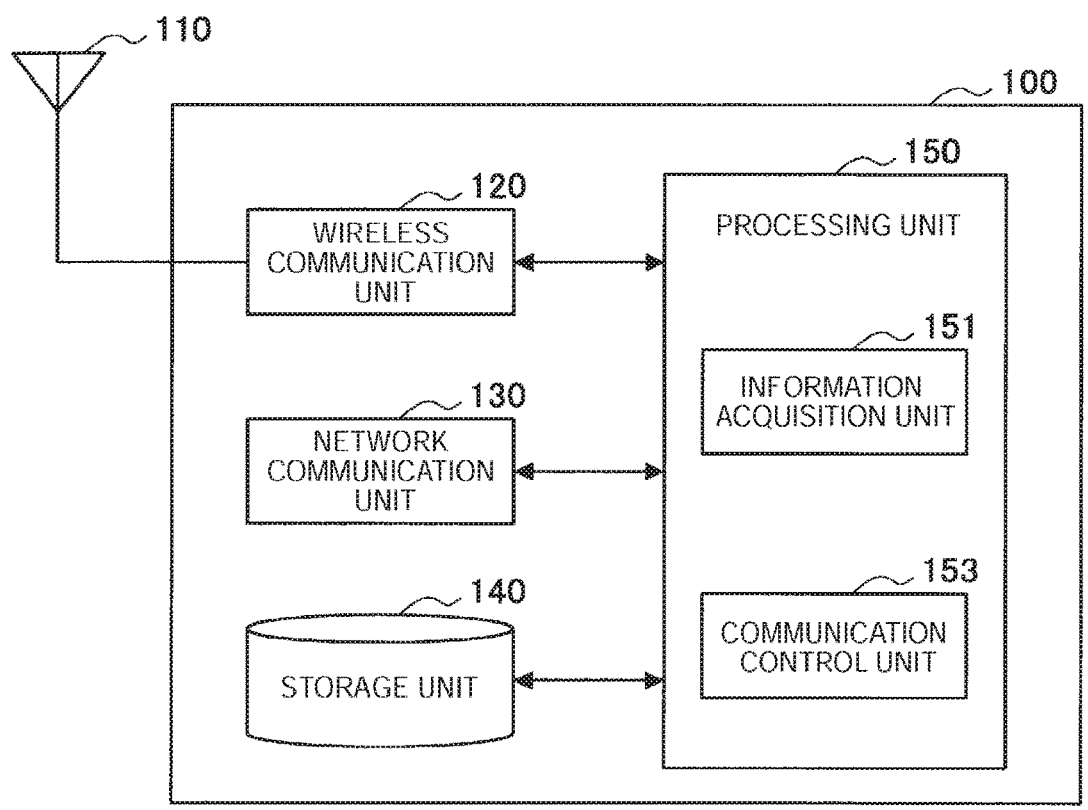
FIG. 6 is a block diagram illustrating an example of a configuration of a base station according to the embodiment.

At first, an example of the configuration of a base station 100 according to an embodiment of the present disclosure will be described with reference to FIGS. 6 to 11. FIG. 6 is a block diagram illustrating an example of the configuration of the base station 100 according to the embodiment of the present disclosure. Referring to FIG. 6, the base station 100 is equipped with an antenna unit 110, a wireless communication unit 120, a network communication unit 130, a storage unit 140, and a processing unit 150.

(Antenna Unit 110)

The antenna unit 110 emits a signal to be output by the wireless communication unit 120 into space as a radio wave. Additionally, the antenna unit 110 converts a radio wave from space into a signal, and outputs the signal to the wireless communication unit 120.

Specifically, in the embodiment of the present disclosure, the antenna unit 110 includes a directional antenna. For example, the directional antenna is a directional antenna available for large-scale MIMO.

In addition, for example, the antenna unit 110 further includes an omnidirectional antenna. Alternatively, the antenna unit 110 may include a sector antenna with or without the omnidirectional antenna.

(Wireless Communication Unit 120)

The wireless communication unit 120 transmits and receives signals. For example, the wireless communication unit 120 transmits a downlink signal to the terminal device 200 and receives an uplink signal from the terminal device 200.

(Network Communication Unit 130)

The network communication unit 130 communicates with other nodes. For example, the network communication unit 130 communicates with another base station 100 and a core network node.

(Storage Unit 140)

The storage unit 140 stores programs and data for the operation of the base station 100.

(Processing Unit 150)

The processing unit 150 provides various functions of the base station 100. The processing unit 150 includes an information acquisition unit 151 and a communication control unit 153. The processing unit 150 may further include constituent elements other than these constituent elements. That is, the processing unit 150 may also perform operations other than operations of these constituent elements.

(Information Acquisition Unit 151)

The information acquisition unit 151 acquires multiple weight sets for beamforming.

(a) Weight Set

For example, the beamforming is large-scale MIMO beamforming. In addition, the multiple weight sets are weight sets for large-scale MIMO beamforming. The beamforming may also be referred to as massive MIMO beamforming or three-dimensional beamforming.

For example, each of the multiple weight sets includes a weight coefficient for each antenna element included in the directional antenna of the base station 100.

For example, the multiple weight sets are some weight sets among all weight sets for the directional antenna. Some of the weight sets may be automatically decided by the base station 100 or the core network node or may be set by an operator of a cellular system. The multiple weight sets may be all of the weight sets rather than some of the weight sets.

(b) Specific Process

For example, the multiple weight sets are stored in the storage unit 140. The information acquisition unit 151 acquires the multiple weight sets from the storage unit 140.

(Communication Control Unit 153)

(1) Transmission Control of a Reference Signal for Measurement

The communication control unit 153 maps a reference signal for measurement to radio resources associated with a weight set in advance for each weight set included in the multiple weight sets and multiplies the reference signal by the weight set.

(a) Mapping of a Reference Signal (a-1) Frame Format

Radio Resources of a Data Area

For example, the radio resources associated with the weight set in advance are radio resources of the data area among subframes including a control area and a data area. That is, the communication control unit 153 maps the reference signal for measurement to radio resources of a data area associated with the weight set in advance.

For example, the control area is an area (a time) in which control channels are arranged, and the data area is an area (a time) in which data channels are arranged. For example, the control channels include a physical downlink control channel (PDCCH) and the data channels include a physical downlink shared channel (PDSCH).

More specifically, for example, when the subframe includes N OFDMA symbols, the control area is 1st to M-th symbols among the N OFDMA symbols, and the data area is (M+1)-th to N-th symbols among the N OFDMA symbols. As an example, N is 14 and M is 3.

Further, for example, the radio resources associated with the weight set in advance are resource elements other than resource elements for a CRS among resource elements of the data area. Hereinafter, a first example of radio resources associated with a weight set in advance will be described with reference to FIG. 7.

Figure 7:
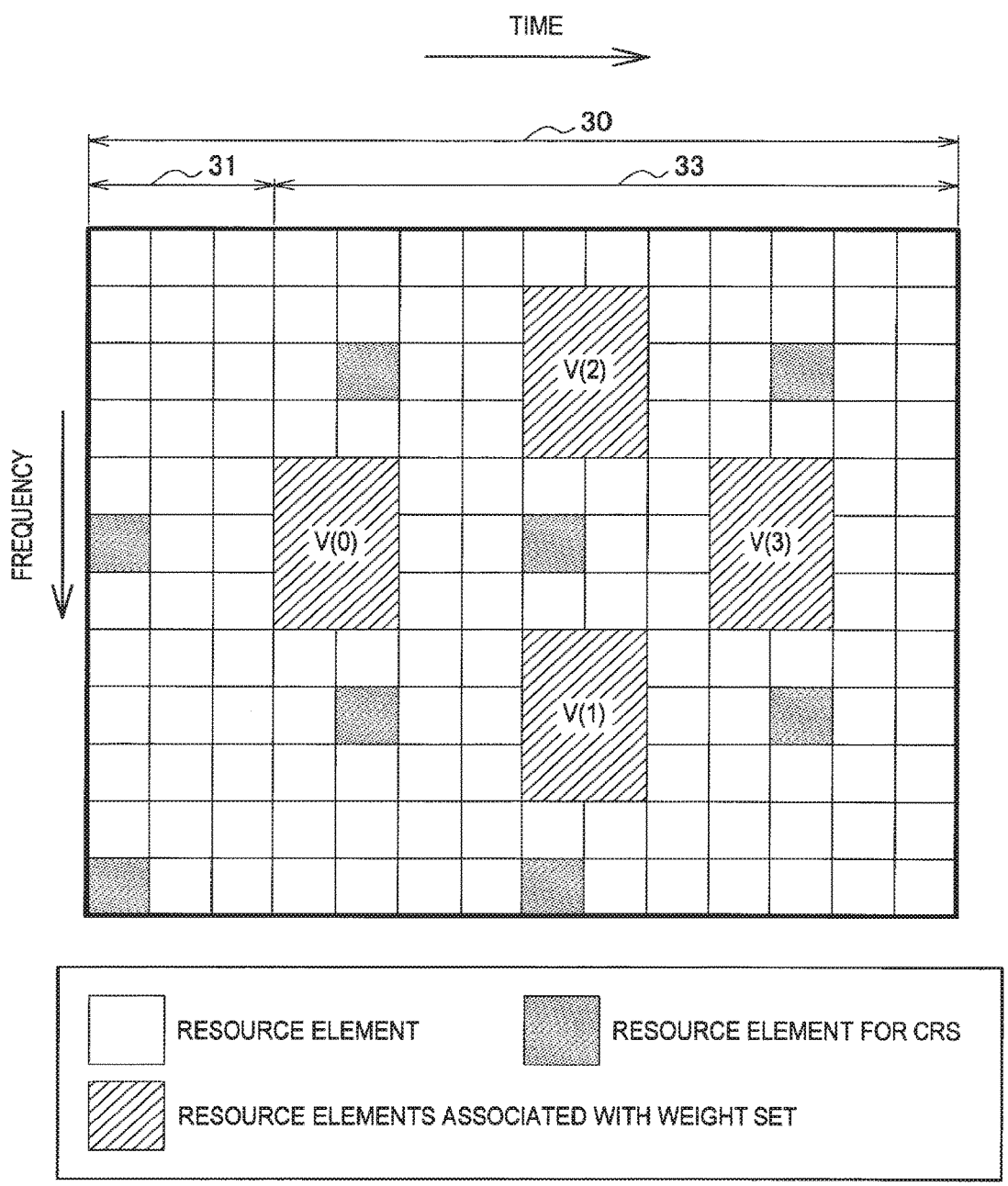
FIG. 7 is an explanatory diagram for describing a first example of radio resources associated with a weight set in advance.

FIG. 7 is an explanatory diagram for describing a first example of radio resources associated with a weight set in advance. Referring to FIG. 7, two resource blocks arranged in a time direction are shown within a subframe 30. In this example, the subframe 30 includes 14 OFDMA symbols. In addition, a control area 31 includes 1st to 3rd OFDMA symbols and a data area 33 includes 4th to 14th OFDMA symbols. For example, resource elements of the data area 33 are associated with a weight set V(i) (i=0 to 3). Then, the communication control unit 153 maps a reference signal for measurement to the resource elements.

When the reference signal for measurement is mapped to radio resources of the data area in this manner, the control area is not changed. Therefore, for example, a device to which technology of the present embodiment is not applied (a legacy device) can acquire control information transmitted through a control channel (for example, PDCCH). In addition, when the reference signal for measurement is mapped to resource elements other than resource elements of a CRS, for example, a device to which technology of the present embodiment is not applied (a legacy device) can appropriately perform measurement of the CRS. In this manner, backward compatibility is guaranteed.

Radio Resources of an MBSFN Subframe

For example, the radio resources associated with the weight set in advance are radio resources of a specific subframe. Further, the special subframe may be an MBSFN (MBMS (Multimedia Broadcast Multicast Services) over a Single Frequency Network) subframe. Hereinafter, a second example and a third example of radio resources associated with a weight set in advance will be described with reference to FIG. 8.

Figure 8:
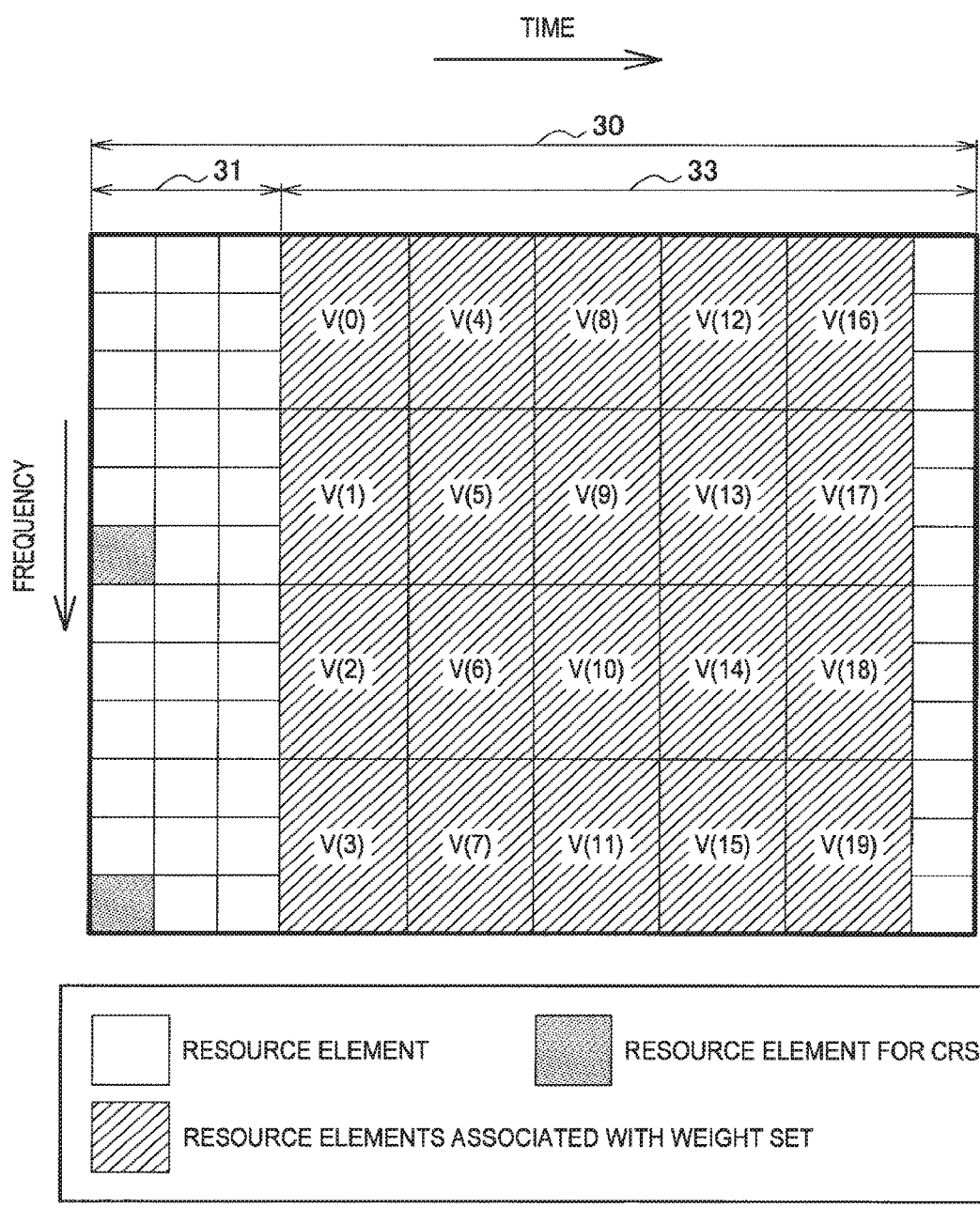
FIG. 8 is an explanatory diagram for describing a second example of radio resources associated with a weight set in advance.

FIG. 8 is an explanatory diagram for describing a second example of radio resources associated with a weight set in advance. Referring to FIG. 8, two resource blocks arranged in a time direction are shown within the subframe 30. In this example, the subframe 30 is the MBSFN subframe and includes 14 OFDMA symbols. In addition, the control area 31 includes 1st to 3rd OFDMA symbols and the data area 33 includes 4th to 14th OFDMA symbols. In this example, since the subframe 30 is the MBSFN subframe, no CRS is transmitted in the data area 33. For example, resource elements of the data area 33 are associated with a weight set V(i) (i=0 to 19). Then, the communication control unit 153 maps a reference signal for measurement to the resource elements.

Figure 9:
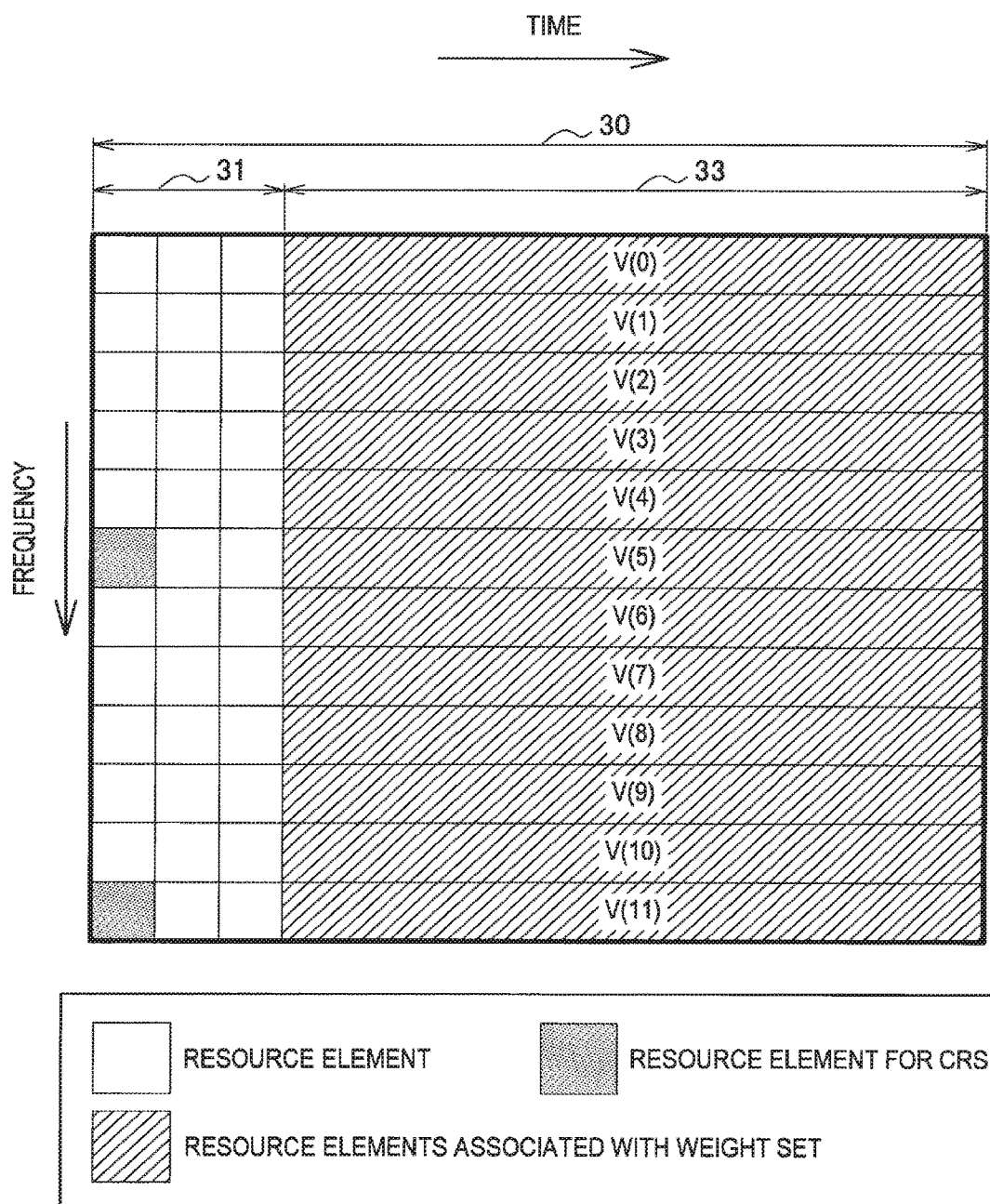
FIG. 9 is an explanatory diagram for describing a third example of radio resources associated with a weight set in advance.

FIG. 9 is an explanatory diagram for describing a third example of radio resources associated with a weight set in advance. Referring to FIG. 9, in this example, resource elements of the data area 33 are associated with a weight set V(i) (i=0 to 11). Then, the communication control unit 153 maps a reference signal for measurement to the resource elements.

When the MBSFN subframe is used in this manner, it is possible to map the reference signal for measurement to more radio resources of the data area, for example, while backward compatibility is guaranteed.

Radio Resources of a Control Area

As described above, for example, radio resources of the data area are associated with each of the multiple weight sets. However, the present embodiment is not limited thereto. Radio resources of the control area and the data area (or only the control area) may be associated with at least one weight set among the multiple weight sets. Hereinafter, a fourth example of radio resources associated with a weight set in advance will be described with reference to FIG. 9.

Figure 10:
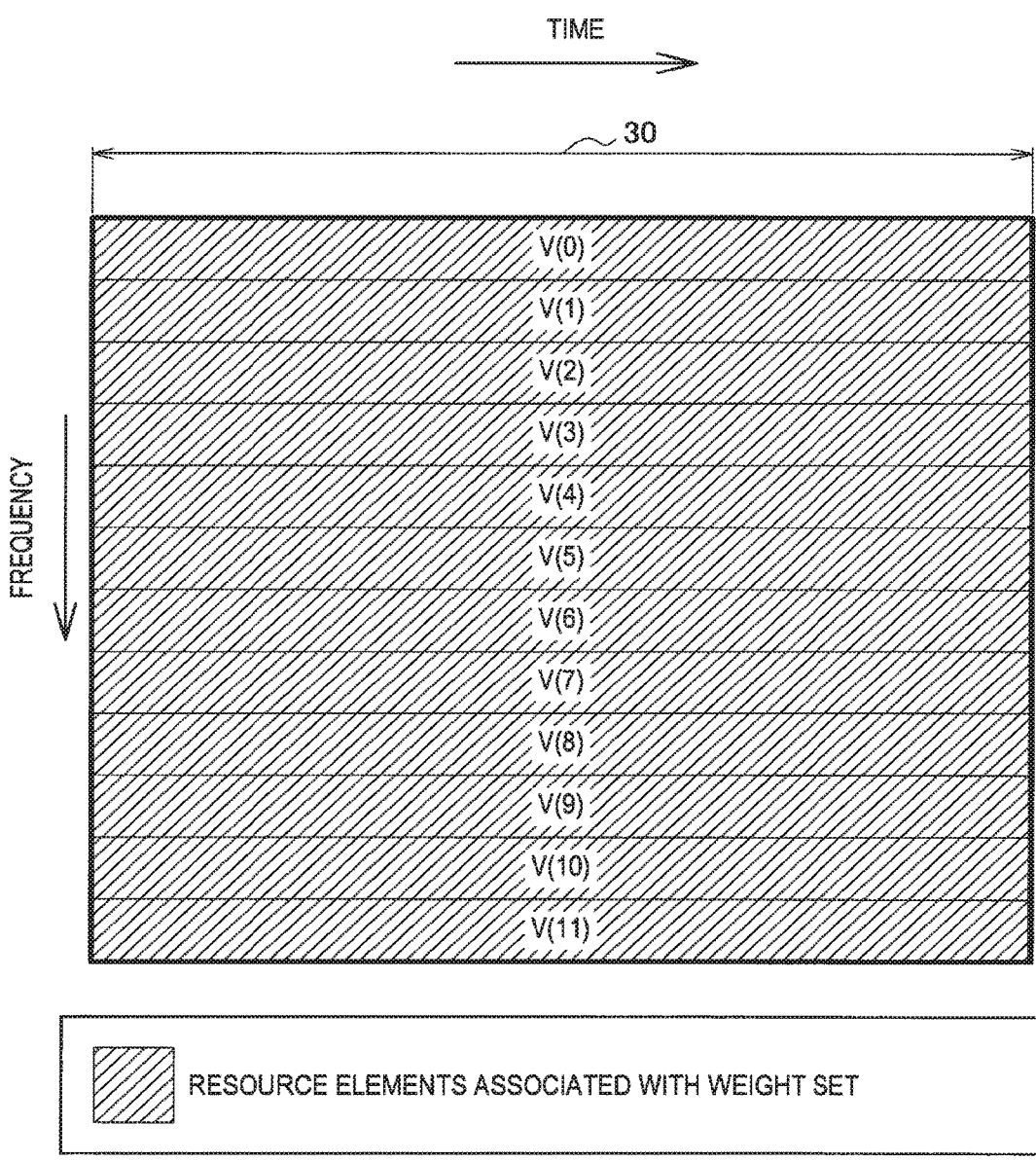
FIG. 10 is an explanatory diagram for describing a fourth example of radio resources associated with a weight set in advance.

FIG. 10 is an explanatory diagram for describing a fourth example of radio resources associated with a weight set in advance. Referring to FIG. 10, two resource blocks arranged in a time direction are shown within the subframe 30. In this example, all resource elements of the subframe are associated with a weight set V(i) (i=0 to 11). Then, the communication control unit 153 maps a reference signal for measurement to the resource elements.

(a-2) Target Subframe

For example, the radio resources associated with the weight set in advance are radio resources of a specific subframe. That is, the communication control unit 153 maps the reference signal for measurement to radio resources associated with a weight set in advance among radio resources of the specific subframe.

For example, the specific subframe is at least one subframe among 10 subframes within a radio frame. The specific subframe may be a subframe having an odd subframe number or may be a subframe having an even subframe number. It is needless to say that the specific subframe is not limited thereto.

Accordingly, for example, it is possible to suppress overhead due to the reference signal for measurement.

For example, the specific subframe is set for each base station, for each group of base stations or for each cellular system. In this case, the communication control unit 153 notifies the terminal device 200 of the specific subframe. Accordingly, for example, setting is possible as necessary. Alternatively, the specific subframe may be a subframe that is defined in advance. Accordingly, for example, there is no overhead due to notification of the specific subframe.

As described above, the special subframe may be the MBSFN subframe.

As described above, for example, the reference signal for measurement is mapped to radio resources of the specific subframe. However, the present embodiment is not limited thereto. As an example, the radio resources associated with the weight set in advance may be radio resources of each subframe. As another example, a subframe including radio resources associated with a weight set in advance may be different among the multiple weight sets.

(a-3) Learning about Radio Resources by a Terminal Device

Notification of Radio Resources

For example, the communication control unit 153 notifies the terminal device 200 of radio resources associated with each of the multiple weight sets.

Notification Technique

For example, the communication control unit 153 informs the terminal device 200 that is positioned within the communication area of the base station 100 of the radio resources. Specifically, for example, the communication control unit 153 informs of the radio resources in system information. The system information is, for example, any system information block (SIB).

The communication control unit 153 may individually notify the terminal device 200 of the radio resources. Specifically, the communication control unit 153 may notify the terminal device 200 of the radio resources by signaling. The signaling may be RRC signaling.

Notification Information

For example, the communication control unit 153 notifies the terminal device 200 of information for specifying the radio resources associated with each of the multiple weight sets (hereinafter referred to as "radio resource information").

As described above, for example, the radio resources associated with each of the multiple weight sets are radio resources of the specific subframe. In this case, the radio resource information includes, for example, information indicating the specific subframe.

In addition, for example, the radio resource information includes information indicating a resource block that includes radio resources associated with each of the multiple weight sets among resource blocks of the subframe. When the radio resources associated with the multiple weight sets are included in the same resource block, the radio resource information includes information indicating a resource block (that is, the same resource block) common in the multiple weight sets. On the other hand, when the radio resources associated with the multiple weight sets are not necessarily included in the same resource block, the radio resource information includes information indicating a resource block that includes radio resources associated with a weight set for each of the multiple weight sets.

In addition, for example, the radio resource information includes information indicating resource elements associated with each of the multiple weight sets. As a specific example, referring again to FIG. 7, the radio resource information includes information indicating resource elements that are associated with a weight set V(i) between two resource blocks for each weight set V(i) (i=0 to 3).

In addition, for example, the radio resource information includes identification information corresponding to the radio resources associated with each of the multiple weight sets. The identification information is also referred to as identification information corresponding to a weight set. As an example, the identification information is resource identification information for identifying the radio resources (for example, an index of radio resources). As another example, the identification information may be weight identification information for identifying a weight set with which radio resources are associated (for example, a codebook index of a weight set). According to such identification information, as will be described below, when measurement reporting is performed, the terminal device 200 can notify the base station 100 of radio resources or a weight set corresponding to the measurement reporting.

As described above, for example, the communication control unit 153 notifies the terminal device 200 of radio resources associated with each of the multiple weight sets. Accordingly, for example, the terminal device 200 can perform measurement of the reference signal for measurement. In addition, radio resources associated with a weight set may be flexibly changed.

Radio Resources Defined in Advance

Radio resources associated with each of the multiple weight sets may be radio resources that are defined in advance. For example, radio resources associated with each of the multiple weight sets may be radio resources that are defined in advance in the specification of the cellular system, similarly to the CRS. In addition, information for identifying radio resources associated with each of the multiple weight sets may be defined in advance. In such a case, the base station 100 may not notify the terminal device 200 of the radio resources. Accordingly, for example, there is no overhead due to notification.

The base station 100 or the core network node may associate one radio resource that is defined in advance with one weight set dynamically or semi-statically. That is, one weight set with which one radio resource that is defined in advance is associated may be changed dynamically or semi-statically.

(a-4) Reference Signal for Measurement
Cell-specific Signal

For example, the reference signal for measurement is a cell-specific signal.

As an example, the reference signal for measurement is a signal that has the same sequence as a CRS. Alternatively, the reference signal for measurement may be another signal specific to a cell that is similar to the CRS.

Accordingly, for example, it is possible to perform measurement for cell selection.

Measurement

For example, the measurement is RRM measurement and measurement of reception power or reception quality. More specifically, for example, the measurement is measurement of RSRP or RSRQ.

(b) Multiplication of a Weight Coefficient

As described above, the communication control unit 153 multiplies a reference signal for measurement mapped to radio resources associated with a weight set in advance for each weight set included in the multiple weight sets by the weight set.

The weight set is a set of weight coefficients for multiple antenna elements. The communication control unit 153 multiplies the reference signal for measurement by a weight coefficient corresponding to an antenna element for each antenna element. Hereinafter, this will be described with reference to a specific example of FIG. 11.

Figure 11:
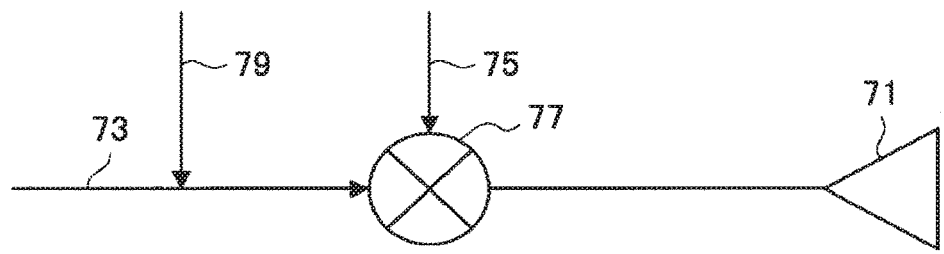
FIG. 11 is an explanatory diagram for describing a case in which a reference signal for measurement is multiplied by a weight coefficient.

FIG. 11 is an explanatory diagram for describing a case in which a reference signal for measurement is multiplied by a weight coefficient. Referring to FIG. 11, a transmission signal 73 corresponding to each antenna element 71 is complex-multiplied by a weight coefficient 75 in a multiplier 77. Then, the transmission signal 73 complex multiplied by the weight coefficient 75 is transmitted from the antenna element 71. In addition, a reference signal for measurement 79 is inserted (that is, is mapped to radio resources) before the multiplier 77 and is complex-multiplied by the weight coefficient 75 in the multiplier 77. Then, the reference signal for measurement 79 complex multiplied by the weight coefficient 75 is transmitted from the antenna element 71.

As a specific example, referring again to FIG. 7, the reference signal for measurement mapped to resource elements associated with a weight set V(i) (i=0 to 3) is multiplied by the weight set V(i). In addition, referring again to FIG. 8, the reference signal for measurement mapped to resource elements associated with a weight set V(i) (i=0 to 19) is multiplied by the weight set V(i).

As described above, the communication control unit 153 maps a reference signal for measurement to radio resources associated with a weight set in advance for each weight set included in the multiple weight sets and multiplies the reference signal by the weight set. Accordingly, for example, it is possible to select an appropriate cell for the terminal device 200 when beamforming is performed.

More specifically, for example, the terminal device 200 can perform measurement of a reference signal for measurement multiplied by a weight set for beamforming rather than a CRS transmitted as omnidirectional radio waves. That is, the terminal device 200 can measure quality of a transmission path of a directional beam rather than quality of a transmission path of omnidirectional radio waves. Therefore, the base station 100 or the terminal device 200 can select, for example, a cell having a good transmission path of a directional beam.

(c) Others (c-1) CRS

For example, the base station 100 transmits not only the reference signal for measurement but also a CRS. That is, the communication control unit 153 maps the CRS to radio resources for a CRS. The CRS is not multiplied by a weight set. Accordingly, for example, a device to which technology of the present embodiment is not applied (a legacy device) can perform measurement. That is, backward compatibility is guaranteed.

(2) Cell Selection

For example, the communication control unit 153 selects a cell for the terminal device 200 based on measurement reporting performed by the terminal device 200. That is, the communication control unit 153 selects a cell for the terminal device 200 based on measurement reporting information provided during the measurement reporting performed by the terminal device 200.

(a) Cell

For example, the base station 100 supports carrier aggregation. In this case, the cell is a Pcell (that is, a PCC) or an Scell (that is, an SCC) of the carrier aggregation.

Alternatively, the base station 100 may not support carrier aggregation. In this case, the cell may refer to the communication area of the base station 100 or a frequency band that the base station 100 uses.

(b) Handover Decision

For example, the communication control unit 153 decides handover of the terminal device 200. That is, the communication control unit 153 performs handover decision of the terminal device 200. When the handover decision is performed, the communication control unit 153 selects a target cell for the terminal device 200.

More specifically, for example, the communication control unit 153 selects a target cell for the terminal device 200 based on measurement reporting performed by the terminal device 200 and decides handover to the target cell. As will be described below, the measurement reporting is reporting performed based on a result of measurement of the reference signal for measurement.

For example, the base station 100 supports carrier aggregation, and the handover is handover of a Pcell (that is, a PCC) of carrier aggregation. In addition, the target cell is a new Pcell (that is, a PCC).

Alternatively, the base station 100 does not support carrier aggregation and the handover may be handover between base stations or handover between frequencies.

(b) Addition of an Scell

For example, the communication control unit 153 adds an Scell (that is, an SCC) for the terminal device 200. The communication control unit 153 selects an Scell to be added.

More specifically, for example, the communication control unit 153 selects an Scell for the terminal device 200 based on measurement reporting performed by the terminal device 200 and performs activation of the Scell. As will be described below, the measurement reporting is reporting performed based on a result of measurement of the reference signal for measurement.

<3.2. Configuration of Terminal Device>

Figure 12:
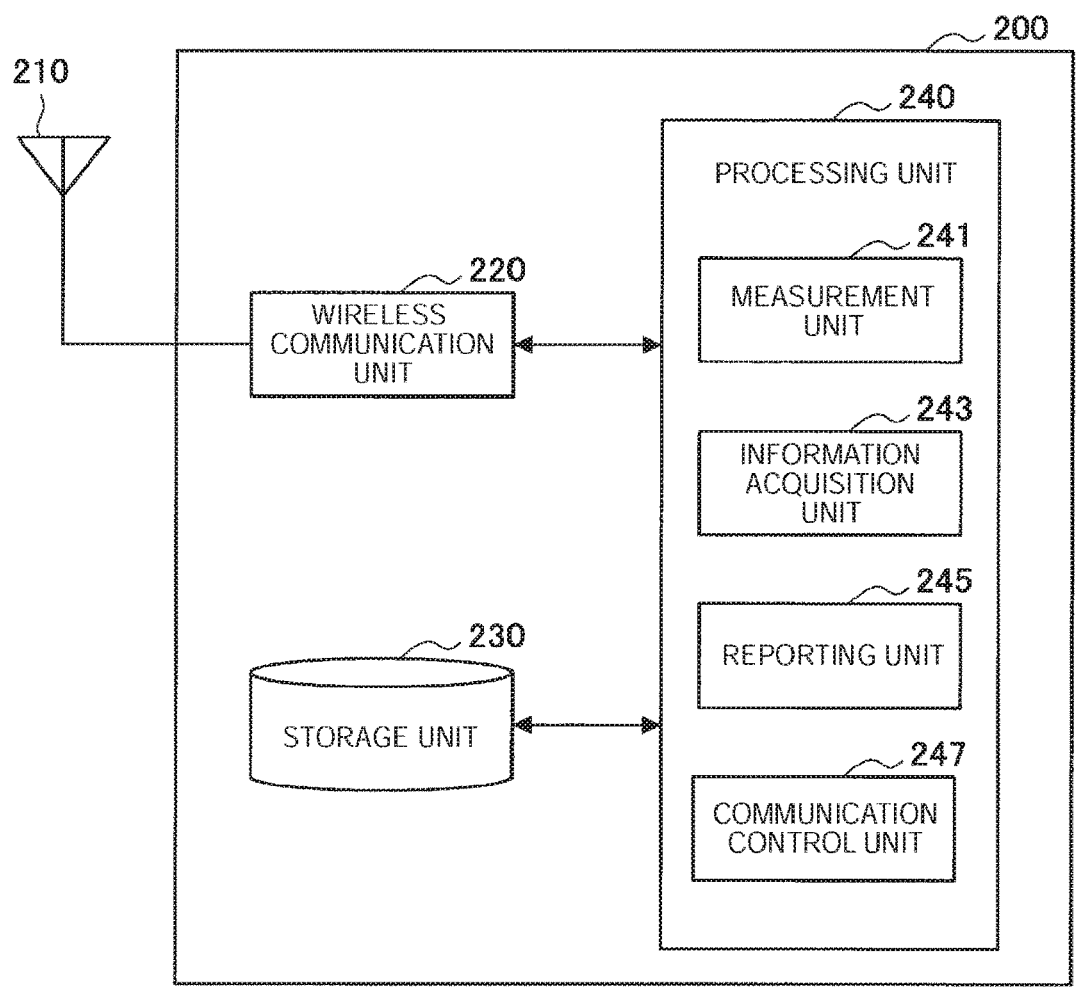
FIG. 12 is a block diagram illustrating an example of a configuration of a terminal device according to the embodiment.

Next, an example of a configuration of the terminal device 200 according to an embodiment of the present disclosure will be described with reference to FIG. 12. FIG. 12 is a block diagram illustrating the example of the configuration of the terminal device 200 according to the embodiment of the present disclosure. Referring to FIG. 12, the terminal device 200 includes an antenna unit 210, a wireless communication unit 220, a storage unit 230, and a processing unit 240.

(Antenna Unit 210)

The antenna unit 210 emits a signal to be output by the wireless communication unit 220 into space as a radio wave. Additionally, the antenna unit 210 converts a radio wave from space into a signal, and outputs the signal to the wireless communication unit 220.

(Wireless Communication Unit 220)

The wireless communication unit 220 transmits and receives a signal. For example, the wireless communication unit 220 receives a downlink signal from the base station 100 and transmits an uplink signal to the base station 100.

(Storage Unit 230)

The storage unit 230 stores programs and data for the operation of the terminal device 200.

(Processing Unit 240)

The processing unit 240 provides various functions of the terminal device 200. The processing unit 240 includes a measurement unit 241, an information acquisition unit 243, a reporting unit 245, and a communication control unit 247. The processing unit 240 may further include constituent elements other than these constituent elements. That is, the processing unit 240 may also perform operations other than operations of these constituent elements.

(Measurement Unit 241)

The measurement unit 241 performs measurement of a reference signal for measurement transmitted using radio resources associated with a weight set for each weight set included in multiple weight sets for beamforming, which is the reference signal multiplied by the weight set.

As described above, the base station 100 transmits the reference signal for measurement multiplied by the weight set using radio resources associated with a weight set for each weight set included in the multiple weight sets. Then, the measurement unit 241 performs measurement of the reference signal for measurement transmitted using the radio resources for each weight set included in the multiple weight sets.

(a) Learning about Radio Resources

As described above, for example, the base station 100 notifies the terminal device 200 of radio resources associated with each of the multiple weight sets. In this case, the measurement unit 241 performs measurement of a reference signal for measurement transmitted using the radio resources of which the base station 100 notifies.

As described above, the radio resources associated with each of the multiple weight sets may be radio resources that are defined in advance. In this case, information for specifying the radio resources may be stored in the storage unit 230. Then, the measurement unit 241 performs measurement of a reference signal for measurement transmitted using the radio resources specified from the information stored in the storage unit 230 (that is, the radio resources that are defined in advance).

(b) Measurement

For example, the measurement is measurement of reception power or reception quality. That is, the measurement unit 241 performs measurement of reception power or reception quality of the reference signal for measurement.

More specifically, for example, the measurement is measurement of RSRP or RSRQ. That is, the measurement unit 241 performs measurement of RSRP or RSRQ of the reference signal for measurement.

The measurement unit 241 may perform measurement of the reference signal for measurement using the same technique as in the measurement of the CRS.

(c) Specific Example

As an example, referring again to FIG. 7, the measurement unit 241 performs measurement of RSRP and RSRQ of the reference signal for measurement transmitted using resource elements associated with a weight set $V(i)$ for each weight set $V(i)$ ($i=0$ to 3). While only two resource blocks are shown in FIG. 7, the measurement unit 241 performs the measurement of all resource blocks including resource elements associated with the weight set $V(i)$ as targets. As a result, the measurement unit 241 generates RSRP and RSRQ for each weight set $V(i)$ ($i=0$ to 3) as a result of measurement for each weight set $V(i)$ ($i=0$ to 3).

(d) Target Base Station 100

It is needless to say that the measurement unit 241 not only performs measurement of the reference signal for measurement for one base station 100 but also performs measurement of the reference signal for measurement for each of the plurality of base stations 100. Accordingly, for example, the base station 100 (or a cell of the base station 100) that is preferable for the terminal device 200 may be selected.

In addition, for example, the base station 100 does not perform measurement of the reference signal for measurement for one frequency band that the base station 100 uses but performs measurement of the reference signal for measurement for each of a plurality of frequency bands (for example, a plurality of CCs) that the base station 100 uses. Accordingly, for example, a frequency band (for example, a PCC or an SCC) preferable for the terminal device 200 may be selected.

(Information Acquisition Unit 243)

The information acquisition unit 243 acquires a result of measurement of the reference signal for measurement transmitted using radio resources associated with a weight set for each weight set included in the multiple weight sets, which is the reference signal multiplied by the weight set.

As described above, for example, the measurement unit 241 performs the measurement for each weight set included in the multiple weight sets. As a result, the measurement unit 241 generates a result of the measurement for each weight set included in the multiple weight sets. Then, the information acquisition unit 243 acquires the generated result of the measurement.

(Reporting Unit 245)

The reporting unit 245 performs measurement reporting to the base station 100 based on the result of the measurement.

(a) Event-triggered Reporting

For example, the reporting unit 245 performs measurement reporting to the base station 100 according to occurrence of an event related to the result of the measurement.

Event

The event is one or more events among, for example, events A1 to A6 and events B1 to B2 defined in 3GPP. Alternatively, the event may be one or more events that are similar to any of the events A1 to A6 and the events B1 to B2 defined in 3GPP.

Measurement Reporting

Unit

For example, the reporting unit 245 performs measurement reporting to the base station 100 for each weight set included in the multiple weight sets.

Specifically, for example, the reporting unit 245 determines whether an event has occurred based on the result of the measurement for each weight set included in the multiple weight sets. Then, when it is determined that an event has occurred based on the result of the measurement, the reporting unit 245 performs measurement reporting of the result of the measurement.

Accordingly, for example, when quality of a transmission path of any beam is good, it is possible to select a cell in which the beam is formed.

Information Provided to Base Station 100

For example, the reporting unit 245 provides measurement reporting information to the base station 100 and thus performs measurement reporting to the base station 100.

For example, the measurement reporting information includes the result of the measurement. More specifically, for example, the result of the measurement is RSRP and/or RSRQ.

In addition, for example, the measurement reporting information includes cell identification information (for example, a cell ID) of a cell to which the reference signal for measurement is transmitted.

In addition, for example, the measurement reporting information includes identification information corresponding to radio resources serving as a target of the measurement (that is, radio resources to which the reference signal for measurement is transmitted). The identification information is also referred to as identification information corresponding to a weight set. As an example, the identification information is resource identification information (for example, an index of radio resources) for identifying radio resources serving as a target of the measurement. Alternatively, the identification information may be weight identification information (for example, a codebook index of a weight set) for identifying a weight set with which radio resources serving as a target of the measurement are associated. According to such identification information, the terminal device 200 can notify the base station 100 of radio resources or a weight set corresponding to measurement reporting.

In addition, for example, the measurement reporting information includes information indicating that measurement reporting is based on a result of measurement of the reference signal for measurement multiplied by a weight set.

(b) Periodic Reporting

For example, the reporting unit 245 performs measurement reporting to the base station 100 periodically.

Period

As an example, the reporting unit 245 performs measurement reporting to the base station 100 at a period that is designated by the base station 100. As another example, the reporting unit 245 may perform measurement reporting to the base station 100 at a period that is defined in advance.

Measurement Reporting

Measurement Reporting of all Weight Sets

As a first example, the reporting unit 245 performs measurement reporting of all of the multiple weight sets.

Specifically, for example, the reporting unit 245 provides measurement reporting information including a result of measurement for each of the multiple weight sets to the base station 100 and thus performs the measurement reporting. In order to identify a result of measurement corresponding to each weight set, the measurement reporting information includes a result of measurement for each weight set of the multiple weight sets and identification information corresponding to radio resources serving as a target of the measurement. As described above, the identification information may be resource identification information for identifying the radio resources or may be weight identification information for identifying a weight set with which the radio resources are associated.

Measurement Reporting for Each Weight Set

As a second example, the reporting unit 245 may perform measurement reporting to the base station 100 for each weight set included in the multiple weight sets.

Specifically, for example, the reporting unit 245 provides measurement reporting information including a result of measurement for each weight set included in the multiple weight sets to the base station 100 and thus performs the measurement reporting. Descriptions of detailed content of the measurement reporting information are the same as in the measurement reporting information described in connection with event-triggered reporting. Therefore, redundant descriptions will be omitted here.

As described above, the reporting unit 245 performs measurement reporting to the base station 100 based on the result of the measurement. Accordingly, for example, the base station 100 can select an appropriate cell for the terminal device 200 when beamforming is performed.
(Communication Control Unit 247)

The communication control unit 247 selects a cell for the terminal device 200 based on the result of the measurement.

For example, when the terminal device 200 is in an idle state, the communication control unit 247 performs cell selection/cell reselection based on the result of the measurement. More specifically, for example, when the terminal device 200 is in an RRC idle state, the communication control unit 247 selects a cell (for example, a cell for receiving paging) for the terminal device 200 to perform communication based on the result of the measurement.

For example, the base station 100 supports carrier aggregation. In this case, the cell is a Pcell (that is, a PCC) of the carrier aggregation.

Alternatively, the base station 100 may not support carrier aggregation. In this case, the cell may refer to the communication area of the base station 100 or may refer to a frequency band that the base station 100 uses.

<<4. Process Flow>>

Figure 13:
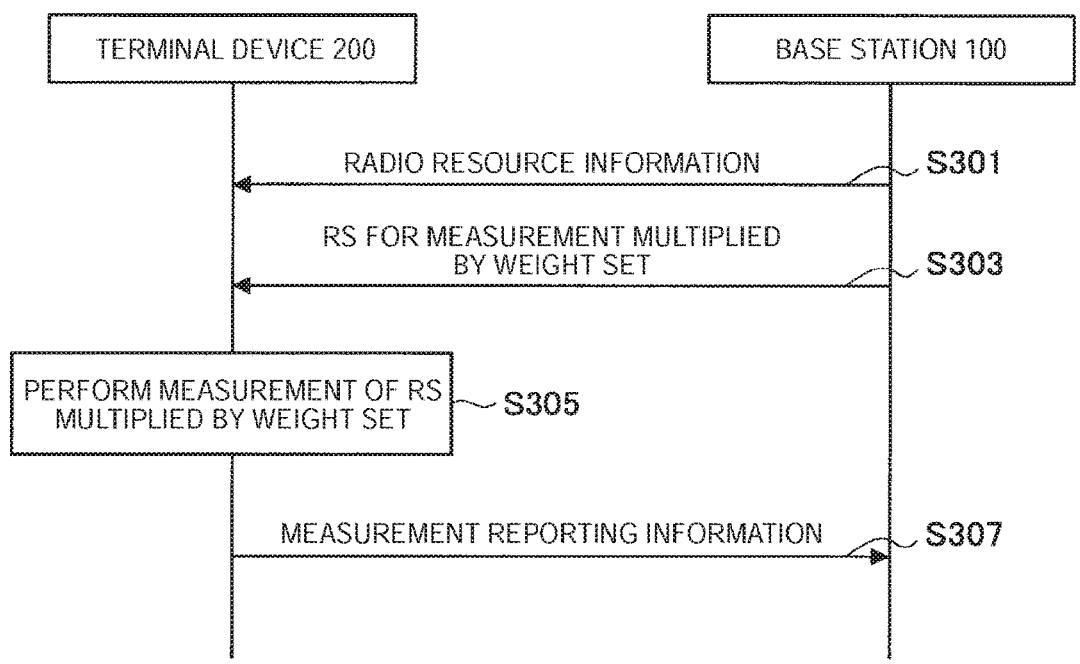
FIG. 13 is a sequence diagram illustrating an example a schematic process flow according to the embodiment.

Next, an example of a process according to an embodiment of the present disclosure will be described with reference to FIG. 13. FIG. 13 is a sequence diagram illustrating an example of a schematic process flow according to an embodiment of the present disclosure.

The base station 100 (the communication control unit 153) notifies the terminal device 200 of radio resources associated with each of multiple weight sets for beamforming (S301). For example, the base station 100 notifies the terminal device 200 of information for specifying the radio resources associated with each of the multiple weight sets (that is, radio resource information). The terminal device 200 acquires the radio resource information.

Then, the base station 100 uses radio resources associated with a weight set in advance for each weight set included in the multiple weight sets and transmits a reference signal (RS) for measurement multiplied by the weight set (S303). For example, the base station 100 (the information acquisition unit 151) acquires the multiple weight sets. Then, the base station 100 (the communication control unit 153) maps a reference signal for measurement to radio resources associated with a weight set in advance for each weight set included in the multiple weight sets and multiplies the reference signal by the weight set.

In addition, the terminal device 200 (the measurement unit 241) performs measurement of a reference signal for measurement (a reference signal for measurement multiplied by the weight set) transmitted using radio resources associated with a weight set for each weight set included in the multiple weight sets (S305).

Then, the terminal device 200 (the information acquisition unit 243) acquires the result of the measurement for each weight set included in the multiple weight sets and the terminal device 200 (the reporting unit 245) performs measurement reporting to the base station 100 based on the result of the measurement (S307). For example, the terminal device 200 (the reporting unit 245) provides measurement reporting information to the base station 100 and thus performs measurement reporting to the base station 100.

<<5. Modification Examples>>

Next, first to third modification examples of the present embodiment will be described with reference to FIG. 14 to FIG. 23.

<5.1. First Modification Example<

First, the first modification example of the present embodiment will be described with reference to FIG. 14 to FIG. 16.

In the first modification example of the present embodiment, radio resources associated with each of the multiple weight sets are different from radio resources used by a base station adjacent to the base station 100 in order to transmit a reference signal for measurement multiplied by a weight set for beamforming.

Accordingly, for example, the terminal device 200 can perform measurement of the reference signal for measurement more accurately (Base Station 100: Communication Control Unit 153)

(1) Transmission Control of a Reference Signal for Measurement

As described above, the communication control unit 153 maps a reference signal for measurement to radio resources associated with a weight set in advance for each weight set included in the multiple weight sets and multiplies the reference signal by the weight set.

(a) Mapping of a Reference Signal

In the first modification example of the present embodiment, the radio resources associated with the weight set in advance are different from radio resources used by a base station adjacent to the base station 100 in order to transmit a reference signal for measurement multiplied by a weight set for beamforming.

That is, the base station 100 uses radio resources associated with a weight set in advance and transmits a reference signal for measurement multiplied by the weight set. In addition, similarly to the base station 100, the adjacent base station uses radio resources associated with a weight set in advance and transmits a reference signal for measurement multiplied by the weight set. Specifically, in the first modification example, the radio resources used by the base station 100 are different from the radio resources used by the adjacent base station.

Same Subframe

For example, the radio resources associated with the weight set in advance are included in the same subframe as the radio resources used by the adjacent base station.

Further, for example, the radio resources associated with the weight set in advance are included in a resource block of the same band as in the radio resources used by the adjacent base station. Hereinafter, this will be described with reference to a specific example of FIG. 14.

Figure 14:
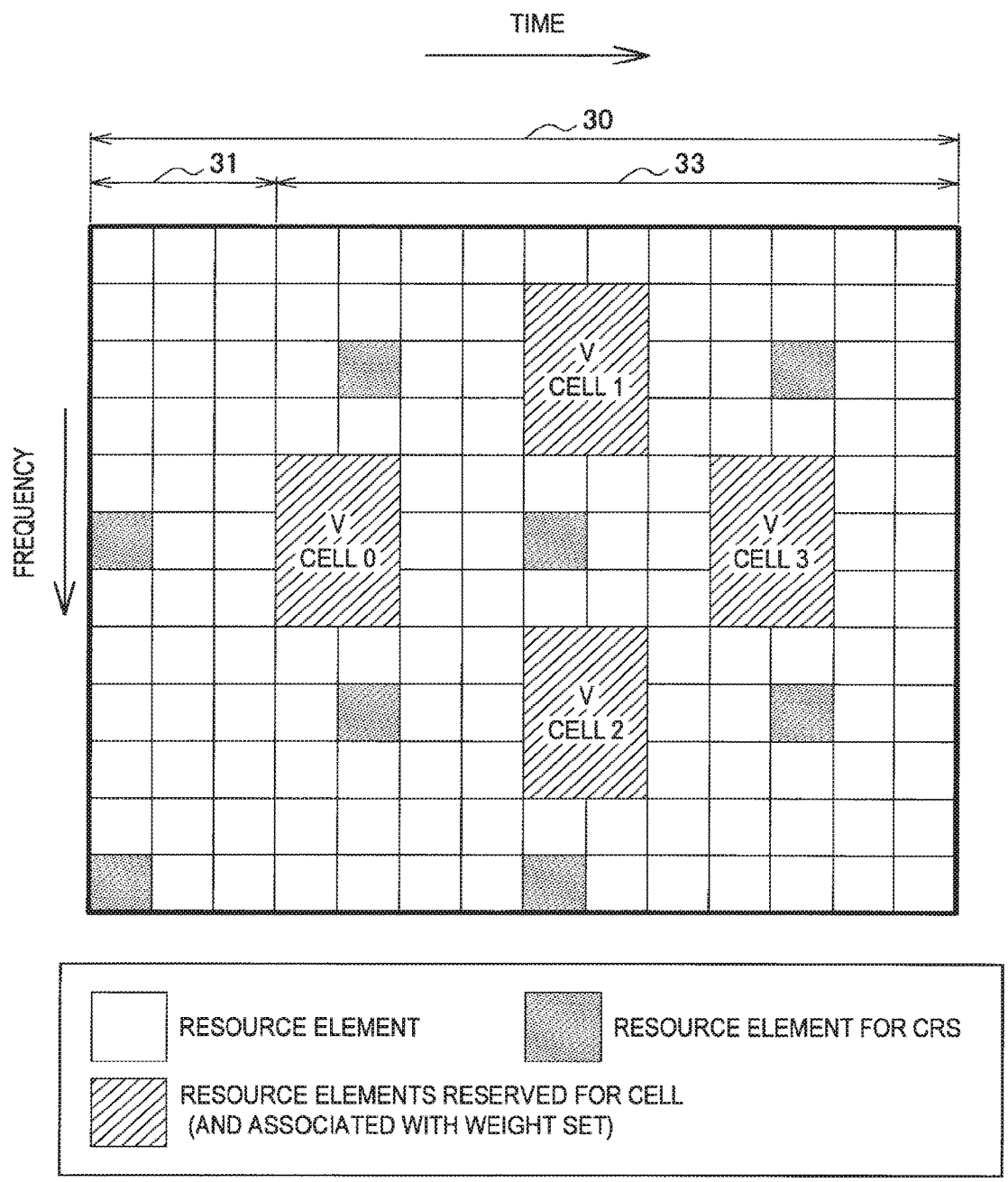
FIG. 14 is an explanatory diagram for describing a first example of a relation between radio resources associated with a weight set in advance and radio resources used by an adjacent base station.

FIG. 14 is an explanatory diagram for describing a first example of a relation between radio resources associated with a weight set in advance and radio resources used by an adjacent base station. Referring to FIG. 14, two resource blocks arranged in a time direction are shown within the subframe 30. For example, resource elements of the data area 33 are reserved for a cell i (i=0 to 3). For example, the base station 100 is a base station of a cell 0, and the communication control unit 153 maps a reference signal for measurement to resource elements (resource elements associated with a weight set V in advance) reserved for the cell 0. As a result, the base station 100 uses the resource elements reserved for the cell 0 and transmits a reference signal for measurement multiplied by the weight set V. In addition, a base station of the cell i (i=1 to 3) is, for example, a base station adjacent to the base station 100. The base station of the cell i uses resource elements reserved for the cell i and transmits the reference signal for measurement multiplied by the weight set V.

Alternatively, the radio resources associated with the weight set in advance may be included in a resource block of a different band from a resource block of the radio resources used by the adjacent base station. Hereinafter, this will be described with reference to a specific example of FIG. 15.

FIG. 15 is an explanatory diagram for describing a second example of a relation between radio resources associated with a weight set in advance and radio resources used by an adjacent base station. Referring to FIG. 15, a pair 40 of resource blocks of the subframe 30 are shown. The pair 40 are arranged in a frequency direction. In addition, each pair 40 includes two resource blocks that are arranged in a time direction. For example, the base station 100 is a base station of the cell 0. The communication control unit 153 maps a reference signal for measurement to radio resources included in the pair 40A and 40E of resource blocks. As a result, the base station 100 uses radio resources included in the pair 40A and 40E of resource blocks and transmits the reference signal for measurement multiplied by the weight set V. In addition, base stations of cells 1 to 3 are, for example, base stations adjacent to the base station 100. Then, the base station of the cell 1 uses radio resources included in the pair 40B and 40F of resource blocks and transmits the reference signal for measurement multiplied by the weight set V. In addition, the base station of the cell 2 uses radio resources included in the pair 40C and 40G of resource blocks and transmits the reference signal for measurement multiplied by the weight set V. In addition, the base station of the cell 3 uses radio resources included in the pair 40D and 40H of resource blocks and transmits the reference signal for measurement multiplied by the weight set V.

As shown in FIG. 15, a reference signal for measurement multiplied by the same weight set may not be transmitted through all frequencies. This is because there is no particular difference in an effect of beamforming between frequency bands. This is especially noticeable when the frequency band is a high frequency band such as a 5 GHz band.

For example, as described above, the radio resources associated with the weight set in advance are included in the same subframe as the radio resources used by the adjacent base station. Accordingly, for example, it is possible to limit an increase of overhead due to a reference signal for measurement multiplied by a weight set within a smaller subframe.

Different Subframe

The radio resources associated with the weight set in advance may be included in a different subframe from the radio resources used by the adjacent base station. Hereinafter, this will be described with reference to a specific example of FIG. 16.

Figure 16:
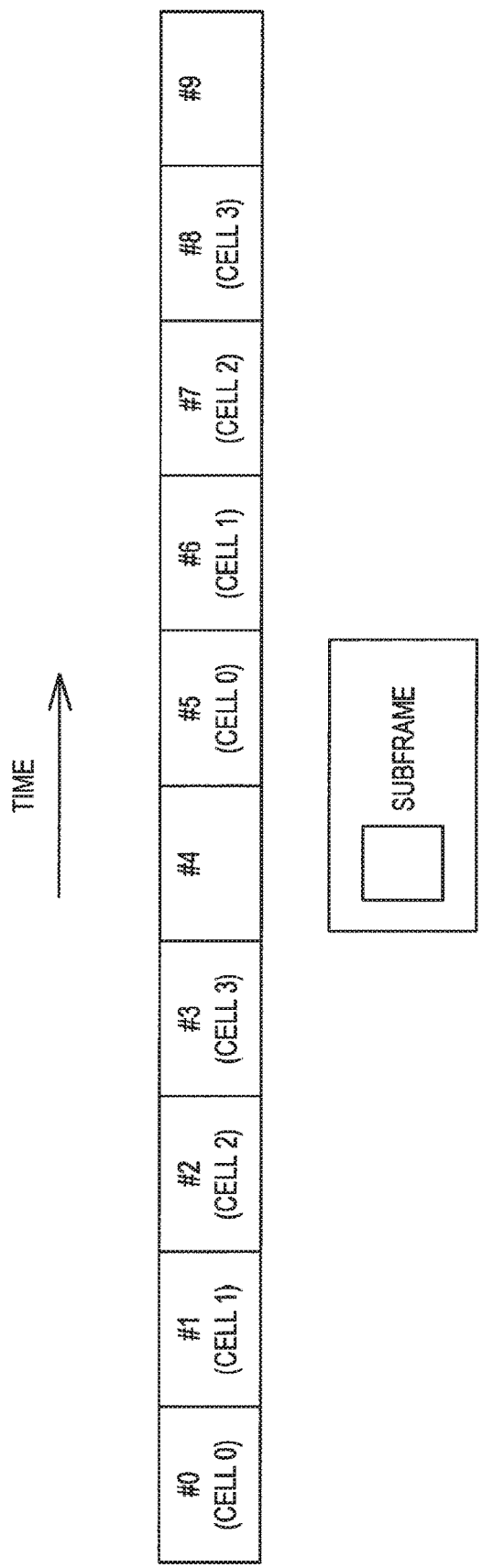
FIG. 16 is an explanatory diagram for describing a second example of a relation between radio resources associated with a weight set in advance and radio resources used by an adjacent base station.

FIG. 16 is an explanatory diagram for describing a third example of a relation between radio resources associated with a weight set in advance and radio resources used by an adjacent base station. Referring to FIG. 16, a radio frame including 10 subframes is shown. For example, the base station 100 is a base station of a cell 0, and the communication control unit 153 maps a reference signal for measurement to radio resources of subframes whose subframe numbers are 0 and 5. As a result, the base station 100 transmits the reference signal for measurement multiplied by the weight set V through subframes whose subframe numbers are 0 and 5. In addition, base stations of cells 1 to 3 are, for example, base stations adjacent to the base station 100. The base station of the cell 1 transmits the reference signal for measurement multiplied by the weight set V through subframes whose subframe numbers are 1 and 6. In addition, the base station of the cell 2 transmits the reference signal for measurement multiplied by the weight set V through subframes whose subframe numbers are 2 and 7. In addition, the base station of the cell 3 transmits the reference signal for measurement multiplied by the weight set V through subframes whose subframe numbers are 3 and 8.

Accordingly, for example, it is possible to distribute an increase of overhead due to a reference signal for measurement multiplied by a weight set among subframes.

Others

Alternatively, techniques described with reference to FIG. 14 to FIG. 15 may be combined. Accordingly, for example, it is possible to transmit a plurality of reference signals for measurement.

The first modification example of the present embodiment has been described above. According to the first modification example, for example, the terminal device 200 can perform measurement of the reference signal for measurement more accurately. More specifically, for example, when two or more base stations use the same radio resources and transmit a reference signal for measurement multiplied by a weight set for beamforming, a great amount of interference is likely to occur according to a beam direction. A significantly great amount of interference is likely to occur especially when the beamforming is large-scale MIMO beamforming. As a result, in the terminal device, there is a possibility of measurement of the reference signal for measurement not being performed accurately. Therefore, when radio resources used for transmitting a reference signal for measurement multiplied by a weight set for beamforming are different between adjacent base stations, the terminal device 200 may perform measurement of the reference signal for more accurate measurement.

<5.2. Second Modification Example21

Next, the second modification example of the present embodiment will be described with reference to FIG. 17 and FIG. 18.

In the second modification example of the present embodiment, the base station 100 multiplies a reference signal for demodulation by a selected weight set among the multiple weight sets. In addition, the base station 100 notifies the terminal device 200 of information about the selected weight set.

In addition, in the second modification example of the present embodiment, the terminal device 200 performs measurement of the reference signal multiplied by the selected weight set among the multiple weight sets. The information about the selected weight set is information of which the base station 100 notifies the terminal device 200. In addition, the reference signal includes a reference signal for measurement transmitted using radio resources associated with the selected weight set, which is the reference signal for measurement multiplied by the selected weight set, and a reference signal for demodulation multiplied by the selected weight set.

Accordingly, for example, the terminal device 200 can use more reference signals multiplied by a weight set for measurement. As a result, accuracy of measurement becomes higher. Alternatively, the base station 100 may reduce the number of reference signals for measurement to be transmitted. That is, radio resources used to transmit a reference signal for measurement may be reduced.

(Base Station 100: Communication Control Unit 153)
(c) Others
(c-2) A Reference Signal for Demodulation In the second modification example of the present embodiment, the communication control unit 153 multiplies a reference signal for demodulation by a selected weight set among the multiple weight sets and notifies the terminal device 200 of identification information (hereinafter referred to as "weight-corresponding identification information") corresponding to the selected weight set.

Multiplication of a Signal for Demodulation by a Selected Weight Set

For example, the selected weight set is a weight set selected for transmitting a signal to a terminal device according to beamforming. In addition, the reference signal for demodulation is a DM-RS (or a UE-specific reference signal) for demodulation by the terminal device. That is, the communication control unit 153 selects a weight set for transmitting a signal to a terminal device according to beamforming and multiplies the DM-RS by the selected weight set.

The terminal device may be the terminal device 200 according to the present embodiment or a terminal device to which technology of the present embodiment is not applied (a legacy terminal).

Notification of Weight-corresponding Identification Information

Notification Technique

For example, the communication control unit 153 notifies the terminal device 200 of the weight-corresponding identification information in downlink control information (DCI).

Specifically, for example, the communication control unit 153 generates DCI including the weight-corresponding identification information. Then, the communication control unit 153 maps a signal of the DCI to radio resources of PDCCH. Hereinafter, this will be described with reference to a specific example of FIG. 17.

Figure 17:
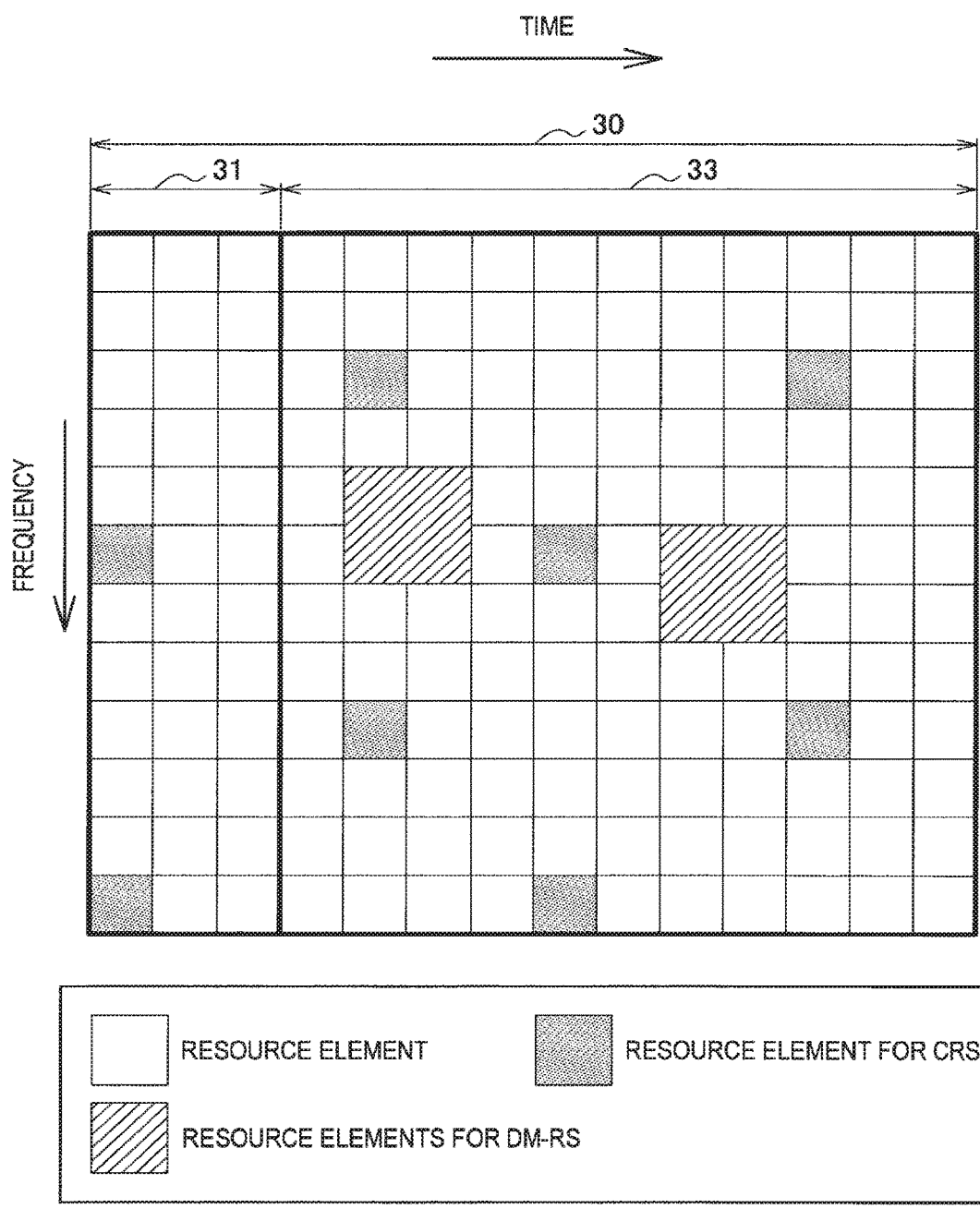
FIG. 17 is an explanatory diagram for describing an example in which a reference signal for demodulation and weight-corresponding identification information are transmitted.

FIG. 17 is an explanatory diagram for describing an example in which a reference signal for demodulation and weight-corresponding identification information are transmitted. Referring to FIG. 17, two resource blocks arranged in a time direction are shown within the subframe 30. For example, the base station 100 transmits DM-RS using resource elements of the data area 33. In addition, the base station 100 uses resource elements of PDCCH of the control area 31 and transmits DCI including the weight-corresponding identification information.

Accordingly, for example, whenever a reference signal for demodulation is transmitted, the terminal device 200 can be notified of the weight-corresponding identification information.

Weight-corresponding Identification Information

For example, the weight-corresponding identification information (that is, the identification information corresponding to the selected weight set) is resource identification information for identifying radio resources associated with the selected weight set (for example, an index of the radio resources). Alternatively, the weight-corresponding identification information may be weight identification information for identifying the selected weight set (for example, a codebook index of the weight set).

Accordingly, for example, the terminal device 200 can know radio resources through which the reference signal for measurement multiplied by the selected weight set is transmitted. Therefore, the terminal device 200 may use both the reference signal for measurement and the reference signal for demodulation in order to measure the reference signal multiplied by the selected weight set. That is, the terminal device 200 may use more reference signals multiplied by a weight set for measurement. As a result, accuracy of measurement becomes higher. Alternatively, the base station 100 may reduce the number of reference signals for measurement to be transmitted. That is, radio resources used to transmit a reference signal for measurement may be reduced.

(Terminal Device 200: Measurement Unit 241)

In the second modification example of the present embodiment, the measurement unit 241 performs measurement of the reference signal multiplied by the selected weight set among the multiple weight sets.

Selected Weight Set

As described above, for example, the selected weight set may be a selected weight set to transmit a signal to a terminal device according to beamforming. The terminal device may be the terminal device 200 itself, another terminal device 200, or a terminal device to which technology of the present embodiment is not applied (a legacy terminal).

As described above, for example, identification information corresponding to the selected weight set (that is, weight-corresponding identification information) is information of which the base station 100 notifies the terminal device 200. The weight-corresponding identification information is resource identification information for identifying radio resources associated with the selected weight set. Alternatively, the weight-corresponding identification information may be weight identification information for identifying the selected weight set. Therefore, the terminal device 200 (the measurement unit 241) can know radio resources through which the reference signal for measurement multiplied by the selected weight set is transmitted.

Reference Signal

In addition, the reference signal multiplied by the selected weight set includes a reference signal for measurement (a reference signal for measurement multiplied by the selected weight set) transmitted using radio resources associated with the selected weight set and a reference signal for demodulation multiplied by the selected weight set. That is, the measurement unit 241 performs measurement of a reference signal including the reference signal for measurement and the reference signal for demodulation multiplied by the selected weight set.

Accordingly, for example, the terminal device 200 can use more reference signals multiplied by a weight set for measurement. As a result, accuracy of measurement becomes higher. Alternatively, the base station 100 may reduce the number of reference signals for measurement to be transmitted. That is, radio resources used to transmit a reference signal for measurement may be reduced.

The reference signal multiplied by the selected weight set may include only a reference signal for demodulation that satisfies predetermined conditions among reference signals for demodulation multiplied by the selected weight set. For example, the predetermined conditions include that radio resources used to transmit a reference signal for demodulation multiplied by the selected weight set are positioned in the vicinity of radio resources used to transmit a reference signal for measurement multiplied by the selected weight set.

(Process Flow)

Figure 18:
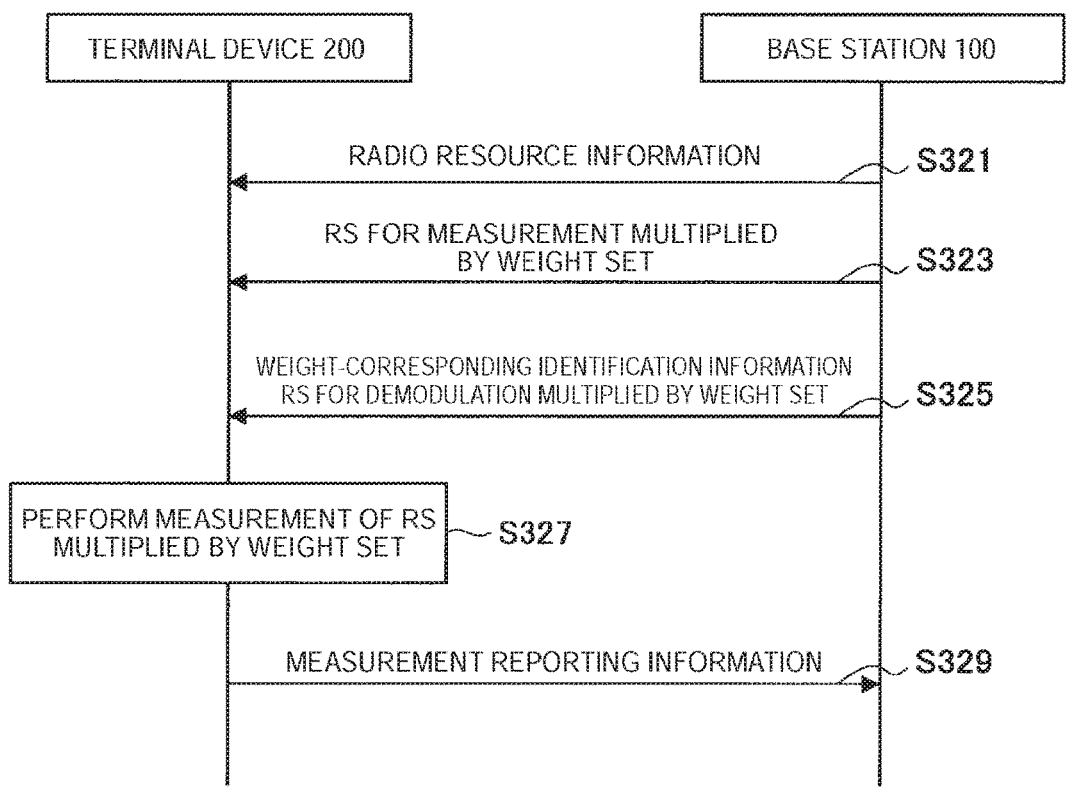
FIG. 18 is a sequence diagram illustrating an example of a schematic process flow according to a second modification example of the embodiment.

FIG. 18 is a sequence diagram illustrating an example of a schematic process flow according to the second modification example of the embodiment of the present disclosure.

The base station 100 (the communication control unit 153) notifies the terminal device 200 of radio resources associated with each of multiple weight sets for beamforming (S321). For example, the base station 100 notifies the terminal device 200 of information for specifying the radio resources associated with each of the multiple weight sets (that is, radio resource information). The terminal device 200 acquires the radio resource information.

Then, the base station 100 (the communication control unit 153) uses radio resources associated with a weight set in advance for each weight set included in the multiple weight sets and transmits a reference signal (RS) for measurement multiplied by the weight set (S323).

In addition, the base station 100 (the communication control unit 153) notifies the terminal device 200 of identification information corresponding to the selected weight set (that is, weight-corresponding identification information) among the multiple weight sets in, for example, DCI. In addition, the base station 100 (the communication control unit 153) transmits a reference signal for demodulation multiplied by the selected weight set (S325).

In addition, the terminal device 200 (the measurement unit 241) performs measurement of a reference signal multiplied by the weight set for each weight set included in the multiple weight sets (S327). Specifically, the terminal device 200 (the measurement unit 241) performs measurement of the reference signal multiplied by the selected weight set among the multiple weight sets. The reference signal includes the reference signal for measurement and the reference signal for demodulation multiplied by the selected weight set.

Then, the terminal device 200 (the information acquisition unit 243) acquires the result of the measurement for each weight set included in the multiple weight sets and the terminal device 200 (the reporting unit 245) performs measurement reporting to the base station 100 based on the result of the measurement (S329). For example, the terminal device 200 (the reporting unit 245) provides measurement reporting information to the base station 100 and thus performs measurement reporting to the base station 100.

The second modification example of the present embodiment has been described above. According to the second modification example, for example, the terminal device 200 can use more reference signals multiplied by a weight set for measurement. As a result, accuracy of measurement becomes higher. Alternatively, the base station 100 may reduce the number of reference signals for measurement to be transmitted. That is, radio resources used to transmit a reference signal for measurement may be reduced.

<5.3. Third Modification Example>>

Next, the third modification example of the present embodiment will be described with reference to FIG. 19 to FIG. 23.

In the third modification example of the present embodiment, the multiple weight sets for beamforming are weight sets for one or more subsets of multiple antenna elements included in a directional antenna available for large-scale MIMO.

Accordingly, for example, it is possible to reduce the number of weight sets by which a reference signal for measurement is multiplied. As a result, the base station 100 may reduce the number of reference signals for measurement to be transmitted. That is, radio resources used to transmit a reference signal for measurement may be reduced.

(Base Station 100: Information Acquisition Unit 151)

As described above, the information acquisition unit 151 acquires multiple weight sets for beamforming.

(a) Weight Set

In a fourth modification example of the present embodiment, the multiple weight sets are weight sets for one or more subsets of multiple antenna elements included in a directional antenna available for large-scale MIMO.

For example, the multiple antenna elements included in the directional antenna are arranged in a first direction and a second direction. In addition, the one or more subsets include a first subset including antenna elements that are arranged in the first direction among the multiple antenna elements and a second subset including antenna elements that are arranged in the second direction among the multiple antenna elements. In addition, for example, the first direction and the second direction are orthogonal to each other. Hereinafter, this will be described with reference to a specific example of FIG. 19.

Figure 19:
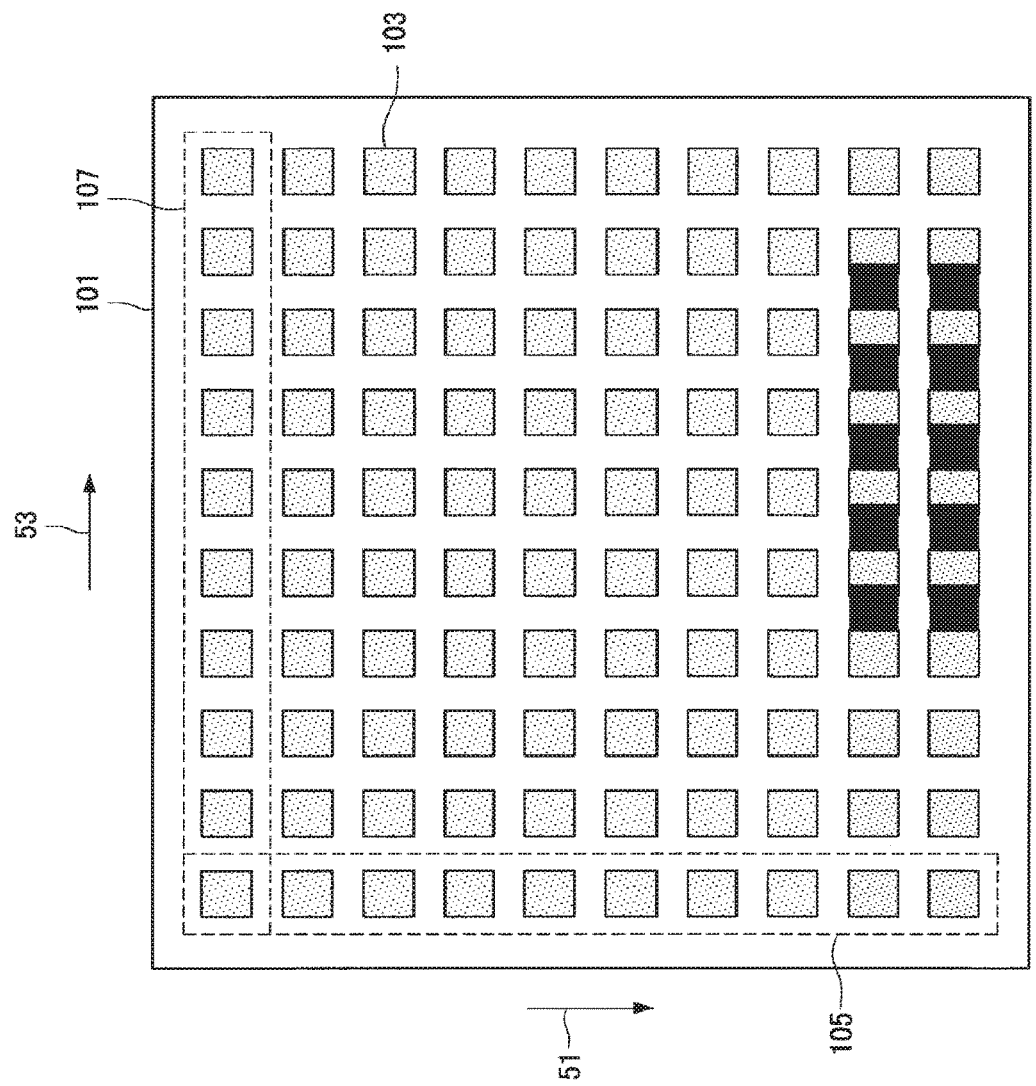
FIG. 19 is an explanatory diagram for describing a subset of multiple antenna elements included in a directional antenna.

FIG. 19 is an explanatory diagram for describing a subset of multiple antenna elements included in a directional antenna. Referring to FIG. 19, the directional antenna 101 is shown. The directional antenna 101 includes multiple antenna elements 103 (100 antenna elements). More specifically, in this example, in the directional antenna 101, 10 antenna elements 103 are arranged in a first direction 51, and 10 antenna elements 103 are arranged in a second direction 53 orthogonal to the first direction 51. For example, the multiple weight sets include a weight set for a first subset 105 including antenna elements 103 that are arranged in the first direction 51 and a weight set for a second subset 107 including antenna elements 103 that are arranged in the second direction 53. That is, the information acquisition unit 151 acquires multiple weight sets including a weight set for the first subset 105 and a weight set for the second subset 107.

As an example, the first direction is a substantially vertical direction and the second direction is a substantially horizontal direction.

(Base Station 100: Communication Control Unit 153)

(1) Transmission Control of a Reference Signal for Measurement

As described above, the communication control unit 153 maps a reference signal for measurement to radio resources associated with a weight set in advance for each weight set included in the multiple weight sets and multiplies the reference signal by the weight set.

(a) Mapping of a Reference Signal

Figure 20:
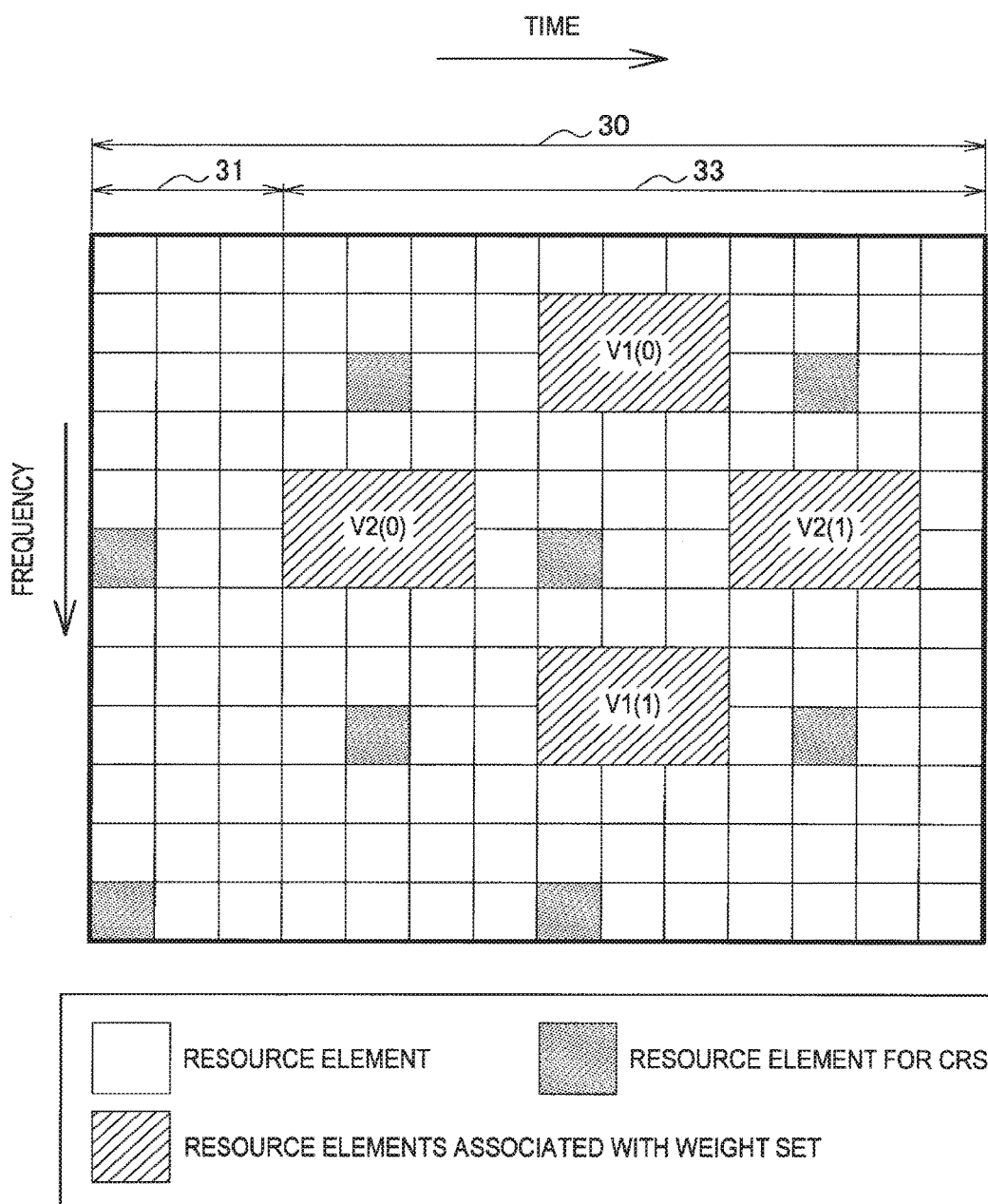
FIG. 20 is an explanatory diagram for describing a first example of radio resources associated with a weight set in advance according to a third modification example.

An example of radio resources associated with a weight set in advance according to the third modification example will be described with reference to FIG. 20. FIG. 20 is an explanatory diagram for describing a first example of radio resources associated with a weight set in advance according to the third modification example. Referring to FIG. 20, two resource blocks arranged in a time direction are shown within the subframe 30. For example, resource elements of the data area 33 are associated with a weight set V1 (i) (i=0, 1) for a first subset. In addition, other resource elements of the data area 33 are associated with a weight set V2 (i) (i=0, 1) for a second subset. Then, the communication control unit 153 maps a reference signal for measurement to these resource elements.

(b) Multiplication of a Weight Coefficient

As described above, the communication control unit 153 multiplies a reference signal for measurement mapped to radio resources associated with a weight set in advance for each weight set included in the multiple weight sets by the weight set.

As a specific example, referring again to FIG. 20, a reference signal for measurement mapped to resource elements associated with the weight set V1 (i) (i=0, 1) for the first subset is multiplied by the weight set V1 (i). Then, the reference signal for measurement multiplied by the weight set V1 (i) is transmitted from the first subset (that is, antenna elements arranged in the first direction). In addition, a reference signal for measurement mapped to resource elements associated with the weight set V2 (i) (i=0, 1) for the second subset is multiplied by the weight set V2 (i). Then, the reference signal for measurement multiplied by the weight set V2 (i) is transmitted from the second subset (that is, antenna elements arranged in the second direction).

(Terminal Device 200: Measurement Unit 241)

As described above, the measurement unit 241 performs measurement of a reference signal for measurement (a reference signal multiplied by the weight set) transmitted using radio resources associated with a weight set for each weight set included in the multiple weight sets.

(c) Specific Example

As an example, referring again to FIG. 20, the measurement unit 241 performs measurement of RSRP and RSRQ of the reference signal for measurement transmitted using resource elements associated with the weight set V1 (i) for each weight set V1 (i) (i=0, 1) for the first subset. While only two resource blocks are shown in FIG. 20, the measurement unit 241 performs the measurement using all resource blocks including resource elements associated with the weight set V1 (i) as targets. As a result, the measurement unit 241 generates RSRP and RSRQ for each weight set V1 (i) (i=0, 1) as a result of measurement for each weight set V1 (i) (i=0, 1). In addition, the measurement unit 241 performs measurement of RSRP and RSRQ of the reference signal for measurement transmitted using resource elements associated with the weight set V2 (i) for each weight set V2 (i) (i=0, 1) for the second subset. While only two resource blocks are shown in FIG. 20, the measurement unit 241 performs the measurement using all resource blocks including resource elements associated with the weight set V2 (i) as targets. As a result, the measurement unit 241 generates RSRP and RSRQ for each weight set V2 (i) (i=0, 1) as a result of measurement for each weight set V2 (i) (i=0, 1).

(Terminal Device 200: Reporting Unit 245)

In the third modification example, the reporting unit 245 performs measurement reporting to the base station 100 based on a result of measurement of a reference signal multiplied by a weight set of the first subset and a result of measurement of a reference signal multiplied by a weight set of the second subset.

In the third modification example, for example, the reporting unit 245 generates an integrated result of measurement based on the result of measurement of a reference signal multiplied by a weight set of the first subset and the result of measurement of a reference signal multiplied by a weight set of the second subset. Then, the reporting unit 245 performs measurement reporting to the base station 100 based on the integrated result of measurement.

Specifically, for example, the reporting unit 245 generates an integrated RSRP, which is an integrated result of measurement, by adding RSRP (dBm), which is the result of measurement of the reference signal multiplied by a weight set of the first subset and RSRP (dBm), which is the result of measurement of the reference signal multiplied by a weight set of the second subset. Then, the reporting unit 245 performs measurement reporting to the base station 100 based on the integrated RSRP. For example, in a case in which the result of measurement is RSRQ, the reporting unit 245 can generate integrated RSRQ, similarly to the case in which the result of measurement is RSRP.

Accordingly, for example, cell selection may be performed in the same manner as when a reference signal for measurement is transmitted from the multiple antenna elements included in the directional antenna.

Alternatively, the base station 100 may generate the integrated result of measurement in place of the terminal device 200 (the reporting unit 245) that generates the integrated result of measurement (for example, integrated RSRP). That is, the base station 100 (the communication control unit 153) may generate an integrated result of measurement based on the result of measurement of the reference signal multiplied by a weight set of the first subset and the result of measurement of the reference signal multiplied by a weight set of the second subset. In this case, the terminal device 200 (the reporting unit 245) may provide the result of measurement of the reference signal multiplied by a weight set of the first subset and the result of measurement of the reference signal multiplied by a weight set of the first subset to the base station 100 during the measurement reporting.

(Case of a Subset of Only One Side)

As described above, for example, the multiple weight sets are weight sets for one or more subsets of the multiple antenna elements. In addition, the one or more subsets include the first subset including antenna elements that are arranged in the first direction and the second subset including antenna elements that are arranged in the second direction. However, the third modification example is not limited thereto.

The multiple weight sets may be a subset including antenna elements that are arranged in only any of the first direction and the second direction. That is, the multiple weight sets may be any of the first subset and the first subset.

Referring again to FIG. 20, for example, resource elements of the data area 33 may be associated with a weight set V1 (i) (i=0, 1) for the first subset. Then, the communication control unit 153 may map a reference signal for measurement to the resource elements. On the other hand, none of the resource elements of the data area 33 may be associated with a weight set V2 (i) (i=0, 1) for the second subset.

As an example, any of the first direction and the second direction may be a substantially vertical direction or a substantially horizontal direction.

Accordingly, for example, it is possible to further reduce the number of weight sets by which a reference signal for measurement is multiplied.

(Process Flow)

(a) First Example

Figure 21:
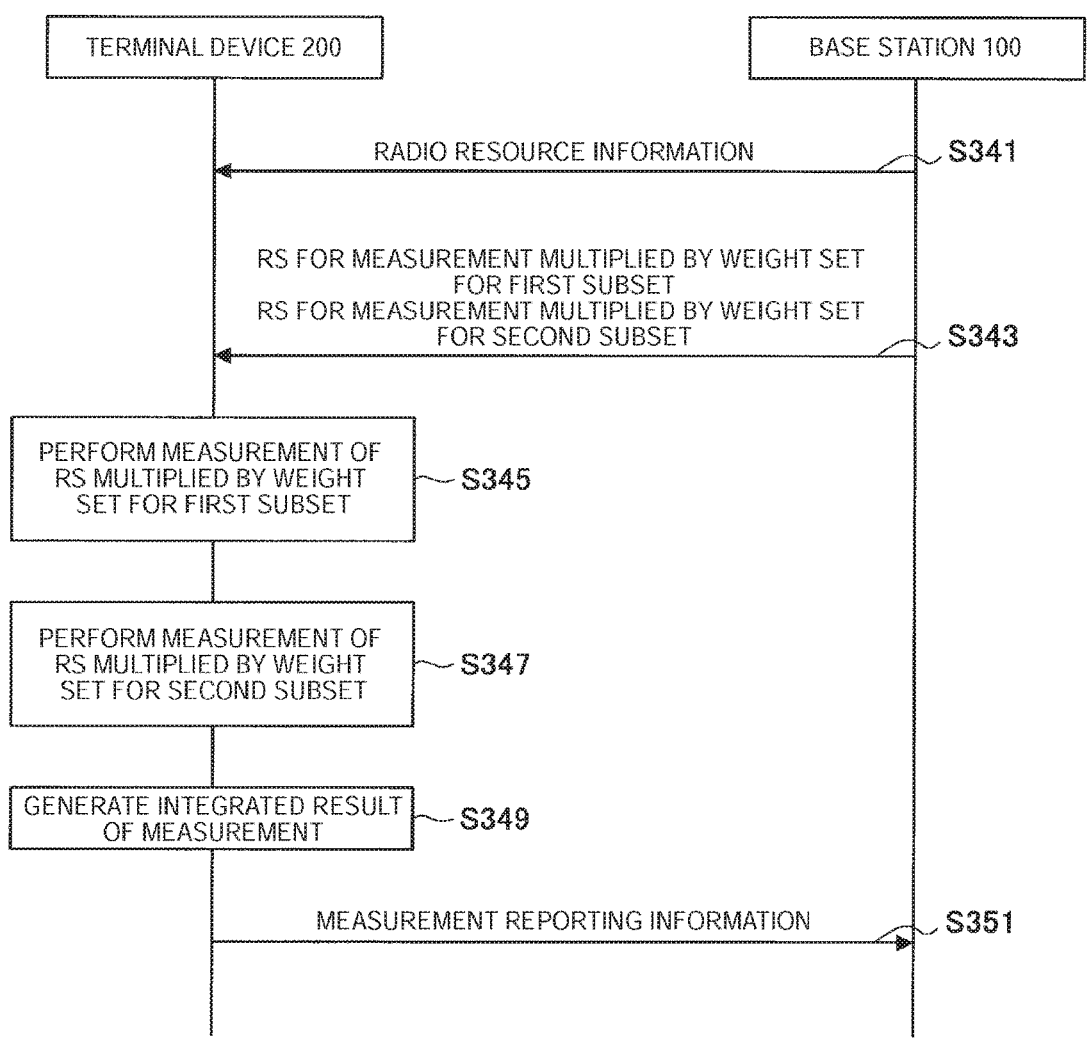
FIG. 21 is a sequence diagram illustrating a first example of a schematic process flow according to the third modification example of the embodiment.

FIG. 21 is a sequence diagram illustrating a first example of a schematic process flow according to the third modification example of the embodiment of the present disclosure.

The base station 100 (the communication control unit 153) notifies the terminal device 200 of radio resources associated with each of multiple weight sets for beamforming (S341). For example, the base station 100 notifies the terminal device 200 of information for specifying the radio resources associated with each of the multiple weight sets (that is, radio resource information). The terminal device 200 acquires the radio resource information.

Then, the base station 100 uses radio resources associated with a weight set in advance for each weight set for a first subset and transmits a reference signal (RS) for measurement multiplied by the weight set (S343). In addition, the base station 100 uses radio resources associated with a weight set in advance for each weight set for a second subset and transmits a reference signal (RS) for measurement multiplied by the weight set (S343). The first subset includes antenna elements that are arranged in the first direction among multiple antenna elements included in a directional antenna available for large-scale MIMO. The second subset includes antenna elements that are arranged in a second direction among the multiple antenna elements.

In addition, the terminal device 200 (the measurement unit 241) performs measurement of a reference signal for measurement (a reference signal for measurement multiplied by the weight set) transmitted using radio resources associated with a weight set for each weight set of the first subset (S345).

In addition, the terminal device 200 (the measurement unit 241) performs measurement of a reference signal for measurement (a reference signal for measurement multiplied by the weight set) transmitted using radio resources associated with a weight set for each weight set for the second subset (S347).

Then, the terminal device 200 (the information acquisition unit 243) acquires a result of measurement of a reference signal for measurement multiplied by a weight set of the first subset and a result of measurement of a reference signal for measurement multiplied by a weight set of the second subset. Further, the terminal device 200 (the reporting unit 245) generates an integrated result of measurement based on the result of measurement of the reference signal for measurement multiplied by a weight set of the first subset and the result of measurement of the reference signal for measurement multiplied by a weight set of the second subset (S349).

Then, the terminal device 200 (the reporting unit 245) performs measurement reporting to the base station 100 based on the integrated result of measurement (S351). For example, the terminal device 200 (the reporting unit 245) provides measurement reporting information to the base station 100 and thus performs measurement reporting to the base station 100. The measurement reporting information includes, for example, the integrated result of measurement.

(b) Second Example

Figure 22:
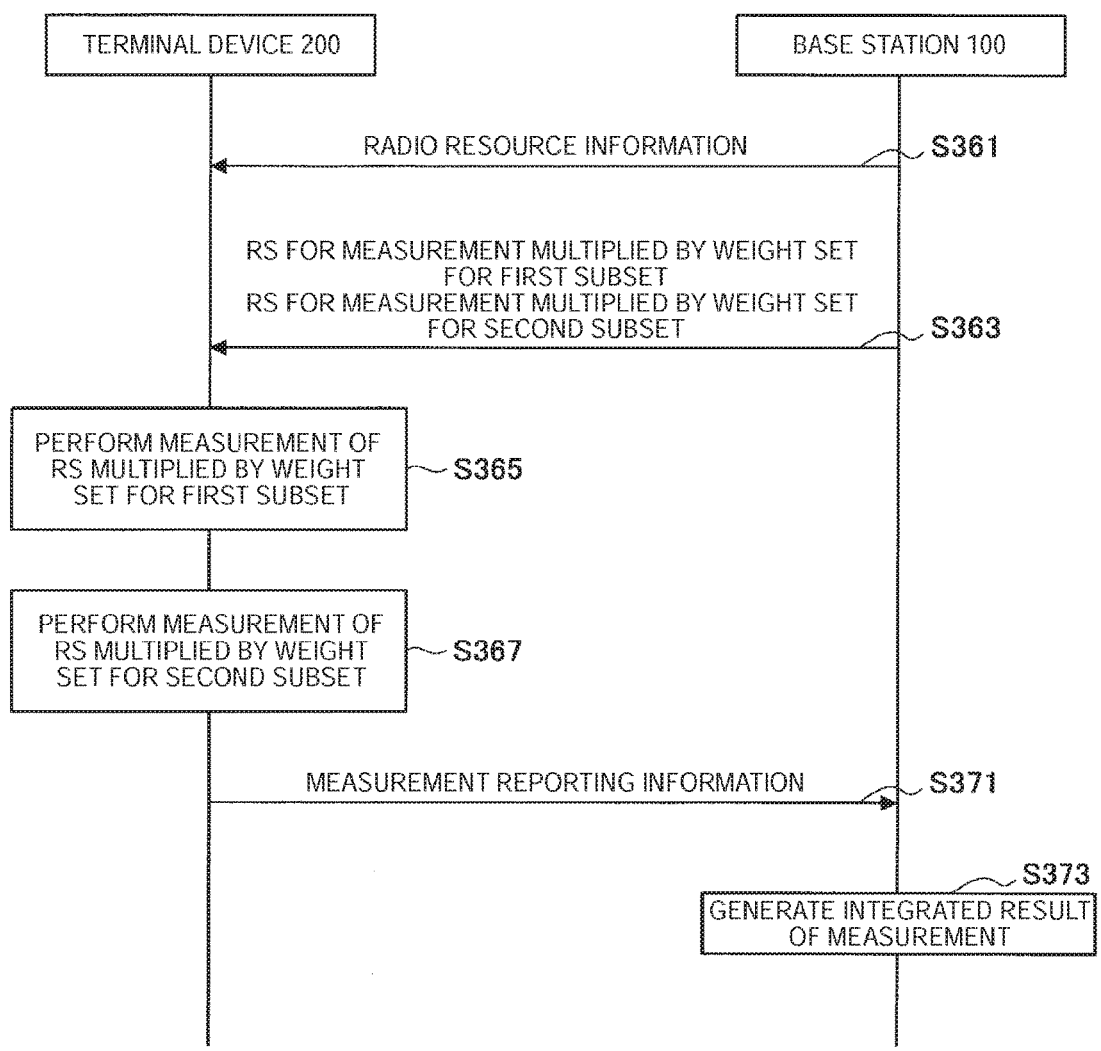
FIG. 22 is a sequence diagram illustrating a second example of a schematic process flow according to the third modification example of the embodiment.

FIG. 22 is a sequence diagram illustrating a second example of a schematic process flow according to the third modification example of the embodiment of the present disclosure. Here, descriptions of Steps S361 to S367 are the same as those of Steps S341 to S347 described with reference to FIG. 21. Therefore, here, only Steps S371 to S373 are described.

The terminal device 200 (the information acquisition unit 243) acquires a result of measurement of a reference signal for measurement multiplied by a weight set of the first subset and a result of measurement of a reference signal for measurement multiplied by a weight set of the second subset. Then, the terminal device 200 (the reporting unit 245) performs measurement reporting to the base station 100 based on the acquired result of measurement (S371). For example, the terminal device 200 (the reporting unit 245) provides measurement reporting information to the base station 100 and thus performs measurement reporting to the base station 100. The measurement reporting information includes, for example, the result of measurement of the reference signal for measurement multiplied by a weight set of the first subset and the result of measurement of the reference signal for measurement multiplied by a weight set of the second subset.

Then, the base station 100 (the communication control unit 153) generates an integrated result of measurement based on the result of measurement of the reference signal for measurement multiplied by a weight set of the first subset and the result of measurement of the reference signal for measurement multiplied by a weight set of the second subset (S373).

(c) Third Example

Figure 23:
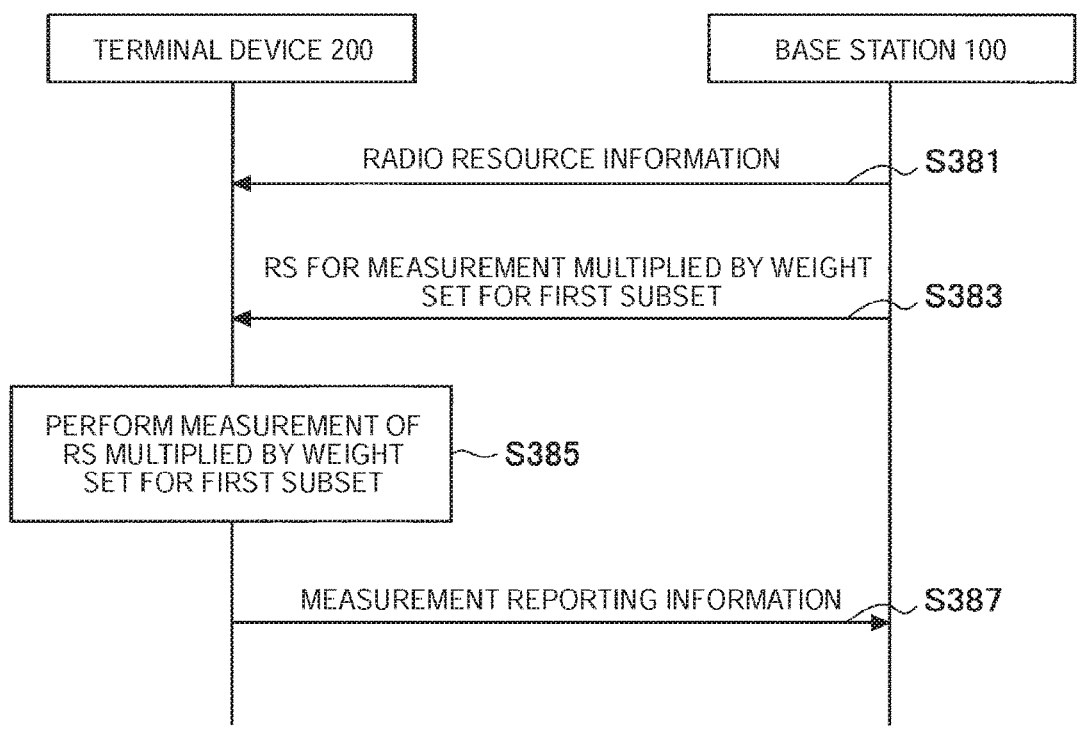
FIG. 23 is a sequence diagram illustrating a third example of a schematic process flow according to the third modification example of the embodiment.

FIG. 23 is a sequence diagram illustrating a third example of a schematic process flow according to the third modification example of the embodiment of the present disclosure.

The base station 100 (the communication control unit 153) notifies the terminal device 200 of radio resources associated with each of multiple weight sets for beamforming (S381). For example, the base station 100 notifies the terminal device 200 of information for specifying the radio resources associated with each of the multiple weight sets (that is, radio resource information). The terminal device 200 acquires the radio resource information.

Then, the base station 100 uses radio resources associated with a weight set in advance for each weight set for a first subset and transmits a reference signal (RS) for measurement multiplied by the weight set (S383). The first subset includes antenna elements that are arranged in the first direction among multiple antenna elements included in a directional antenna available for large-scale MIMO.

In addition, the terminal device 200 (the measurement unit 241) performs measurement of a reference signal for measurement (a reference signal for measurement multiplied by the weight set) transmitted using radio resources associated with a weight set for each weight set of the first subset (S385).

Then, the terminal device 200 (the information acquisition unit 243) acquires a result of measurement of a reference signal for measurement multiplied by a weight set of the first subset. Further, the terminal device 200 (the reporting unit 245) performs measurement reporting to the base station 100 based on the acquired result of measurement (S387). For example, the terminal device 200 (the reporting unit 245) provides measurement reporting information to the base station 100 and thus performs measurement reporting to the base station 100. The measurement reporting information includes, for example, the result of measurement of the reference signal for measurement multiplied by a weight set of the first subset.

The third modification example of the present embodiment has been described above. According to the third modification example, for example, it is possible to reduce the number of weight sets by which a reference signal for measurement is multiplied. As a result, the base station 100 may reduce the number of reference signals for measurement to be transmitted. That is, radio resources used to transmit a reference signal for measurement may be reduced.

<<6. Application Examples>>

Technology according to the present disclosure is applicable to various products. For example, the base station 100 may be implemented as a type of eNB such as a macro eNB or a small eNB. The small eNB may be an eNB to cover a cell smaller than a macro cell such as a pico eNB, a micro eNB, or a home (femto) eNB. Conversely, the base station 100 may also be realized as another type of base station, such as a NodeB or a base transceiver station (BTS). The base station 100 may also include a main unit that controls wireless communication (also called a base station device), and one or more remote radio heads (RRHs) placed in a location separate from the main unit. Also, various types of terminals to be described below temporarily or semi-permanently execute a base station function and therefore may operate as the base station 100. Further, at least a part among constituent elements of the base station 100 may be realized as a base station device or a module for the base station device.

In addition, the terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, at least a part of constituent elements of the terminal device 200 may be realized as a module mounted onboard these terminals (for example, an integrated circuit module configured on a single die).

<6.1. Application Examples of Base Station>

First Application Example

Figure 24:
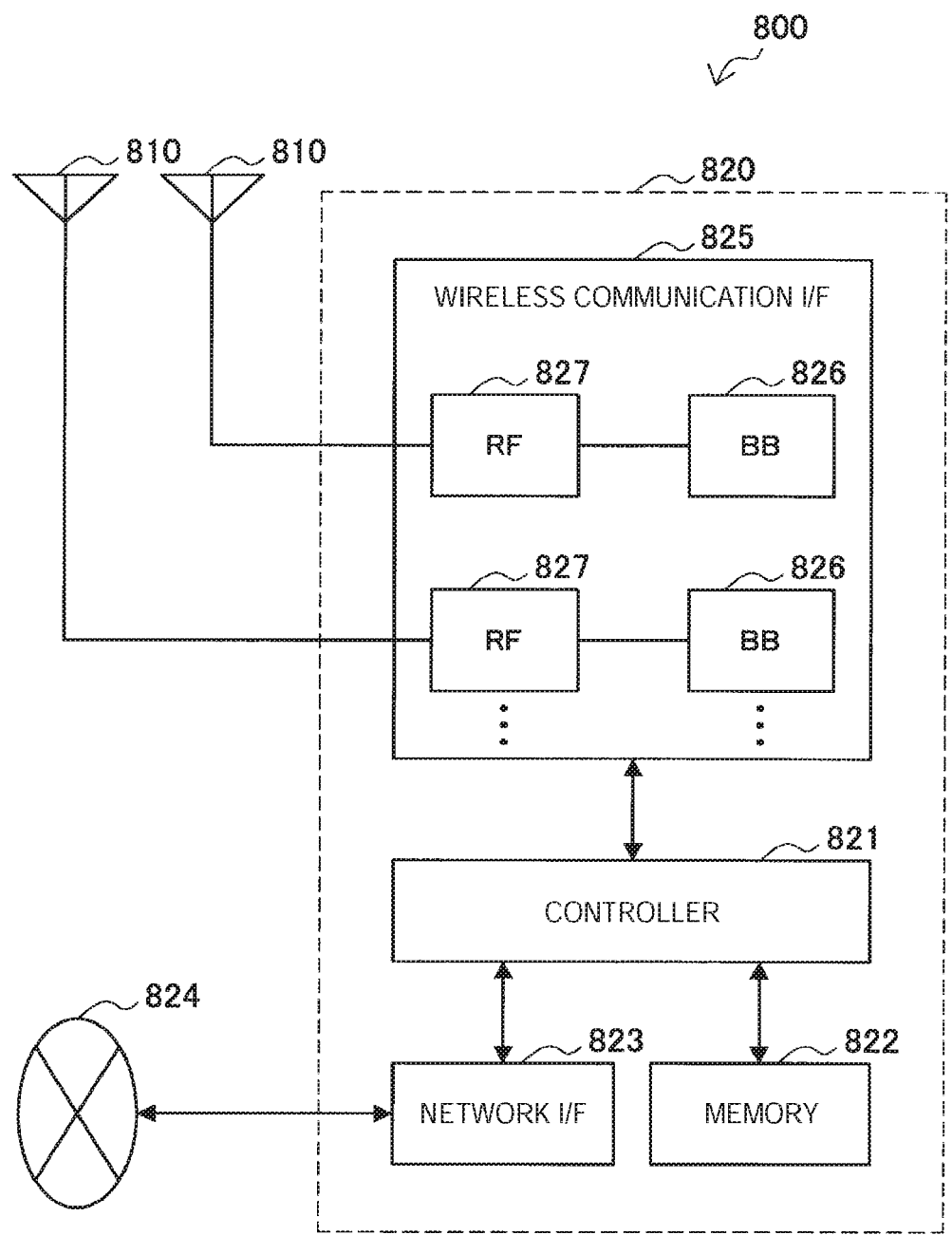
FIG. 24 is a block diagram illustrating a first example of a schematic configuration of an eNB.

FIG. 24 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 24. For example, the multiple antennas 810 may be compatible with multiple frequency bands used by the eNB 800. Although FIG. 24 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. if the network interface 823 is a wireless communication interface, the network interface 823 may use a higher frequency band for wireless communication than a frequency band used by the wireless communication interface 825.

The wireless communication interface 825 supports any cellular communication scheme such as LTE and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-mentioned logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 24. For example, the multiple BB processors 826 may be compatible with multiple frequency bands used by the eNB 800. The wireless communication interface 825 may include the multiple RF circuits 827, as illustrated in FIG. 24. For example, the multiple RF circuits 827 may be compatible with multiple antenna elements. Although FIG. 24 illustrates the example in which the wireless communication interface 825 includes the multiple BB processors 826 and the multiple RF circuits 827, the wireless communication interface 825 may also include a single BB processor 826 or a single RF circuit 827.

In the eNB 800 illustrated in FIG. 24, the information acquisition unit 151 and the communication control unit 153 described with reference to FIG. 6 may be implemented in the wireless communication interface 825 (for example, the BB processor). Alternatively, at least a part of these constitutional elements may be implemented in the controller 821. As one example, the eNB 800 is equipped with a module including a part (for example, the BB processor 826) or all of the wireless communication interface 825 and/or the controller 821, and the information acquisition unit 151 and the communication control unit 153 may be implemented in the module. In this case, the above-mentioned module may store a program for causing the processor to function as the information acquisition unit 151 and the communication control unit 153 (in other words, a program for causing the processor to execute the operation of the information acquisition unit 151 and the communication control unit 153) and execute the program. As another example, a program for causing the processor to function as the information acquisition unit 151 and the communication control unit 153 is installed in the eNB 800, and the wireless communication interface 825 (for example, the BB processor 826) and/or the controller 821 may execute the program. As mentioned above, the eNB 800, the base station device 820, or the above-mentioned module may be provided as the device including the information acquisition unit 151 and the communication control unit 153, and the program for causing the processor to function as the information acquisition unit 151 and the communication control unit 153 may be provided. Also, a readable recording medium recording the above-mentioned program may be provided.

Also, in the eNB 800 illustrated in FIG. 24, the wireless communication unit 120 described with reference to FIG. 6 may be implemented in the wireless communication interface 825 (for example, the RF circuit 827). Also, the antenna unit 110 may be implemented in the antenna 810. Also, the network communication unit 130 may be implemented in the controller 821 and/or the network interface 823.

Second Application Example

Figure 25:
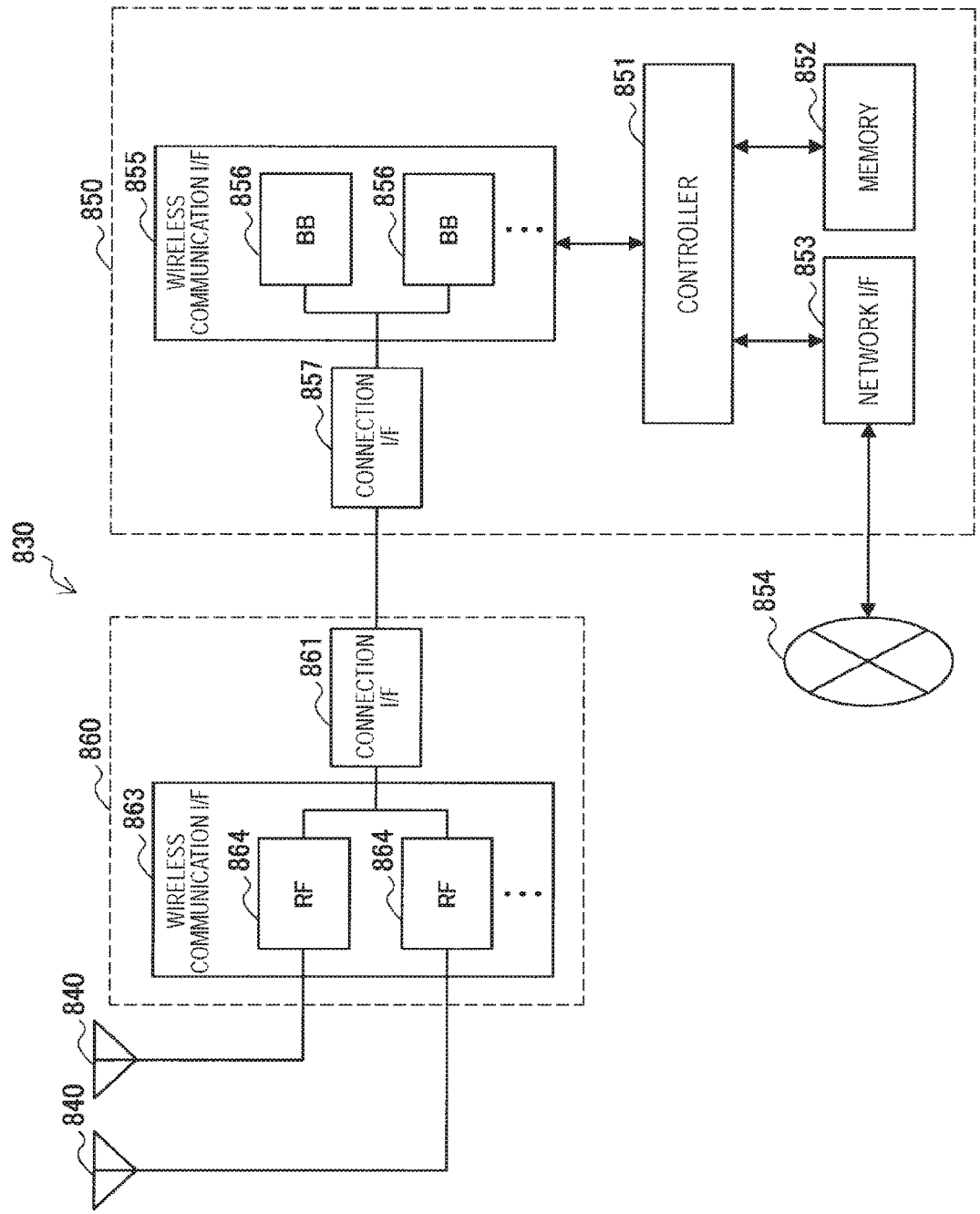
FIG. 25 is a block diagram illustrating a second example of a schematic configuration of an eNB.

FIG. 25 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an AMMO antenna), and is used for the RRH 860 to transmit and receive radio signals. The eNB 830 may include the multiple antennas 840, as illustrated in FIG. 25. For example, the multiple antennas 840 may be compatible with multiple frequency bands used by the eNB 830. Although FIG. 25 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 24.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 24, except the BB processor 856 is connected to the RF circuit 864 of the RRH 860 via the connection interface 857. The wireless communication interface 855 may include the multiple BB processors 856, as illustrated in FIG. 25. For example, the multiple BB processors 856 may be compatible with multiple frequency bands used by the eNB 830. Although FIG. 25 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-mentioned high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-mentioned high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 25. For example, the multiple RF circuits 864 may support multiple antenna elements. Although FIG. 25 illustrates the example in which the wireless communication interface 863 includes the multiple RF circuits 864, the wireless communication interface 863 may also include a single RF circuit 864.

In the eNB 830 illustrated in FIG. 32, the information acquisition unit 151 and the communication control unit 153 described with reference to FIG. 6 may be implemented in the wireless communication interface 855 and/or the wireless communication interface 863. Alternatively, at least a part of these constitutional elements may be implemented in the controller 851. As one example, the eNB 830 is equipped with a module including a part (for example, the BB processor 856) or all of the wireless communication interface 855 and/or the controller 851, and the information acquisition unit 151 and the communication control unit 153 may be implemented in the module. In this case, the above-mentioned module may store a program for causing the processor to function as the information acquisition unit 151 and the communication control unit 153 (in other words, a program for causing the processor to execute the operation of the information acquisition unit 151 and the communication control unit 153) and execute the program. As another example, a program for causing the processor to function as the information acquisition unit 151 and the communication control unit 153 is installed in the eNB 830, and the wireless communication interface 855 (for example, the BB processor 856) and/or the controller 851 may execute the program. As mentioned above, the eNB 830, the base station device 850, or the above-mentioned module may be provided as the device including the information acquisition unit 151 and the communication control unit 153, and the program for causing the processor to function as the information acquisition unit 151 and the communication control unit 153 may be provided. Also, a readable recording medium recording the above-mentioned program may be provided.

Also, in the eNB 830 illustrated in FIG. 25, the wireless communication unit 120 described, for example, with reference to FIG. 6 may be implemented in the wireless communication interface 863 (for example, the RF circuit 864). Also, the antenna unit 110 may be implemented in the antenna 840. Also, the network communication unit 130 may be implemented in the controller 851 and/or the network interface 853.

<6.2. Application Examples of Terminal Device>

First Application Example

Figure 26:
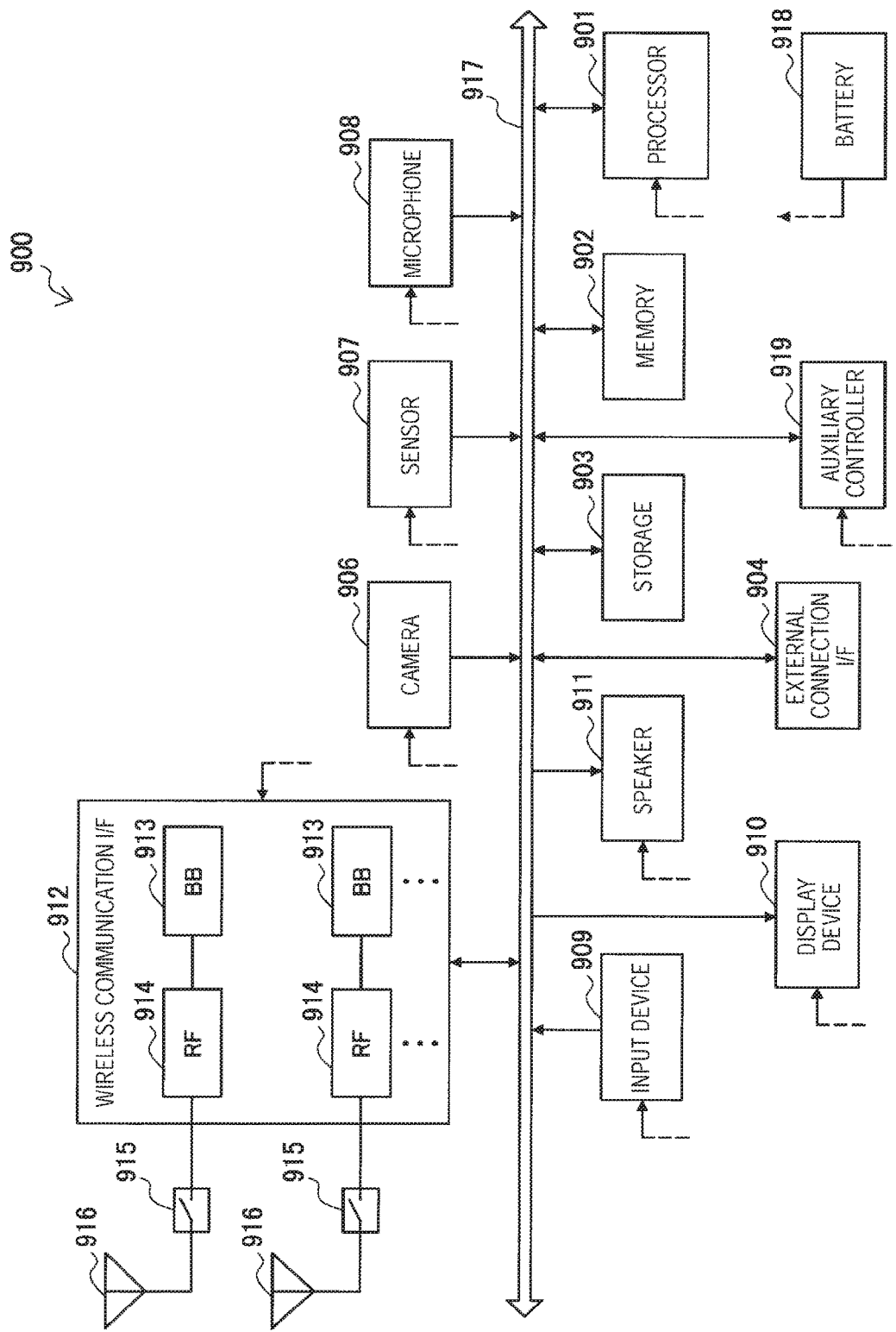
FIG. 26 is a block diagram illustrating an example of a schematic configuration of a smartphone.

FIG. 26 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 934 and the multiple RF circuits 914, as illustrated in FIG. 26. Although FIG. 26 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a radio local area network (LAN) communication scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 26. Although FIG. 26 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 26 via feeder lines, which are partially shown as dashed lines in the figure. The auxiliary controller 919 operates a minimum necessary function of the smartphone 900, for example, in a sleep mode.

In the smartphone 900 shown in FIG. 26, one or more constituent elements (the measurement unit 241, the information acquisition unit 243, the reporting unit 245 and/or the communication control unit 247) included in the processing unit 240 described with reference to FIG. 12 may be implemented in the wireless communication interface 912. Alternatively, at least a part among these constituent elements may be implemented in the processor 901 or the auxiliary controller 919. As an example, the smartphone 900 is equipped with a module including a part (for example, the BB processor 913) or all of the wireless communication interface 912, the processor 901, and/or the auxiliary controller 919 and the one or more constituent elements may be implemented in the module. In this case, the module may store a program (in other words, a program causing a processor to execute operations of the one or more constituent elements) causing a processor to function as the one or more constituent elements and execute the program. As another example, a program causing a processor to function as the one or more constituent elements is installed in the smartphone 900 and the wireless communication interface 912 (for example, the BB processor 913), the processor 901, and/or the auxiliary controller 919 may execute the program. As described above, the smartphone 900 or the module may be provided as a device including the one or more constituent elements. The program causing a processor to function as the one or more constituent elements may be provided. In addition, a readable recording medium recording the program may be provided.

Also, in the smartphone 900 illustrated in FIG. 26, the wireless communication unit 220 described, for example, with reference to FIG. 12 may be implemented in the wireless communication interface 912 (for example, the RF circuit 914). Also, the antenna unit 210 may be implemented in the antenna 916.

Second Application Example

Figure 27:
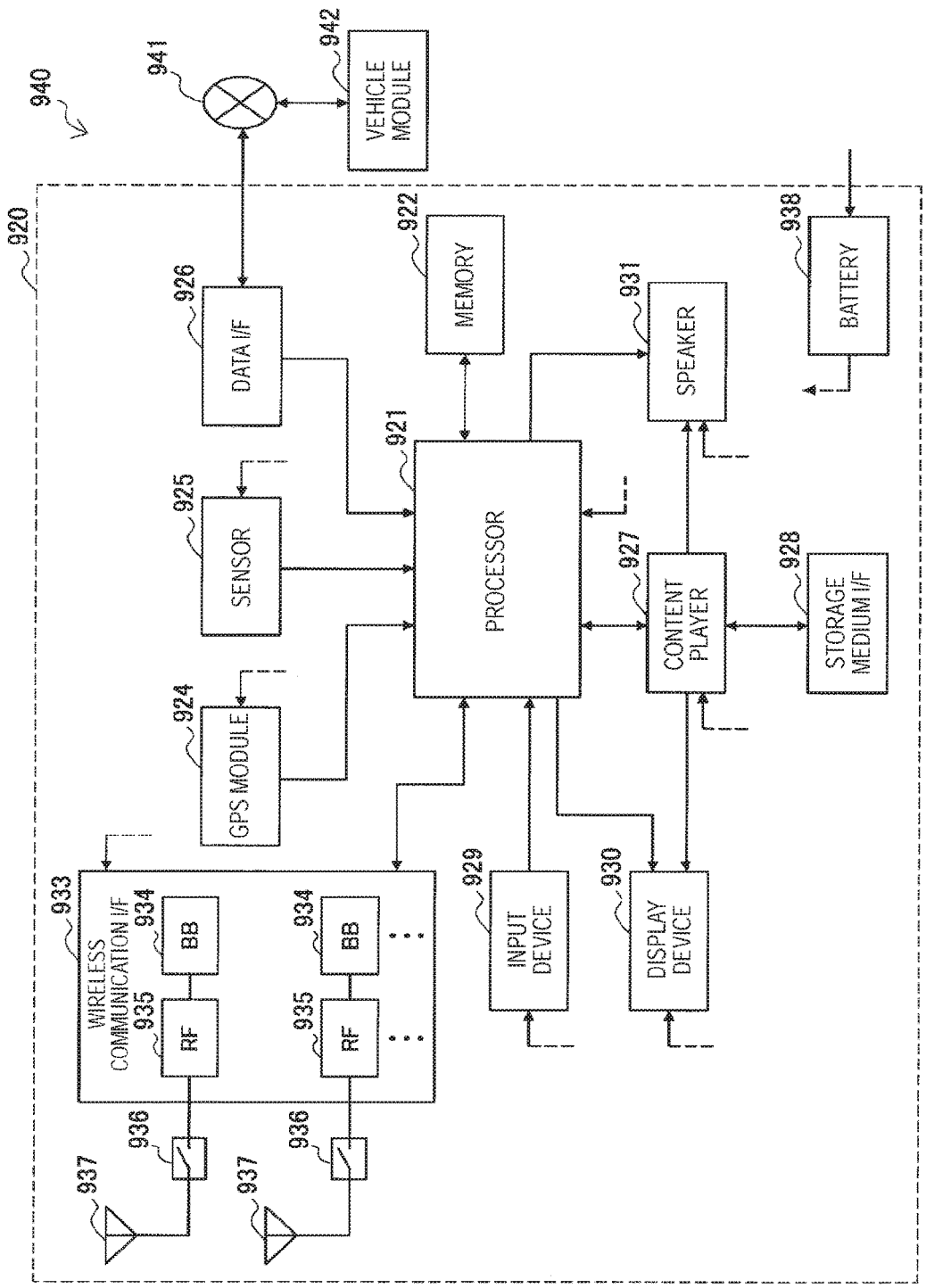
FIG. 27 is a block diagram illustrating an example of a schematic configuration of a car navigation device.

FIG. 27 is a block diagram illustrating an example of a schematic configuration of a car navigation device 920 to which the technology of the present disclosure may be applied. The car navigation device 920 includes a processor 921, a memory 922, a global positioning system (GPS)

module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 27. Although FIG. 27 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a radio LAN communication scheme. In that case, the wireless communication interface 912 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 27. Although FIG. 27 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 27 via feeder lines that are partially shown as dashed lines in the figure. The battery 938 accumulates power supplied form the vehicle.

In the car navigation device 920 shown in FIG. 27, one or more constituent elements (the measurement unit 241, the information acquisition unit 243, the reporting unit 245 and/or the communication control unit 247) included in the processing unit 240 described with reference to FIG. 12 may be implemented in the wireless communication interface 933. Alternatively, at least a part among these constituent elements may be implemented in the processor 921. As an example, the car navigation device 920 is equipped with a module including a part (for example, the BB processor 934) and/or all of the wireless communication interface 933, the processor 921 and the one or more constituent elements may be implemented in the module. In this case, the module may store a program (in other words, a program causing a processor to execute operations of the one or more constituent elements) causing a processor to function as the one or more constituent elements and execute the program. As another example, a program causing a processor to function as the one or more constituent elements is installed in the car navigation device 920 and the wireless communication interface 933 (for example, the BB processor 934), and/or the processor 921 may execute the program. As described above, the car navigation device 920 or the module may be provided as a device including the one or more constituent elements. The program causing a processor to function as the one or more constituent elements may be provided. In addition, a readable recording medium recording the program may be provided.

Also, in the car navigation device 920 illustrated in FIG. 27, the wireless communication unit 220 described, for example, with reference to FIG. 12 may be implemented in the wireless communication interface 933 (for example, the RF circuit 935). Also, the antenna unit 210 may be implemented in the antenna 937.

The technology of the present disclosure may also be realized as an in-vehicle system (or a vehicle) 940 including one or more blocks of the car navigation device 920, the in-vehicle network 941, and a vehicle module 942. That is, the in-vehicle system (or the vehicle) 940 may be provided as a device including at least one of the constitutional elements (the measurement unit 241, the information acquisition unit 243, the reporting unit 245 and/or the communication control unit 247). The vehicle module 942 generates vehicle data such as vehicle speed, engine speed, and trouble information, and outputs the generated data to the in-vehicle network 941.

<<7. Conclusion>>

The devices and the processes according to the embodiments of the present disclosure have been described with reference to FIGS. 3 to 27.

According to an embodiment of the present disclosure, the base station 100 includes the information acquisition unit 151 configured to acquire multiple weight sets for beamforming and the communication control unit 153 configured to map a reference signal for measurement to radio resources associated with a weight set in advance for each weight set included in the multiple weight sets and multiply the reference signal by the weight set.

In addition, according to an embodiment of the present disclosure, the terminal device 200 includes the information acquisition unit 243 configured to acquire a result of measurement of a reference signal for measurement transmitted using radio resources associated with a weight set for each weight set included in multiple weight sets for beamforming, which is the reference signal multiplied by the weight set, and the reporting unit 245 configured to perform measurement reporting to a base station based on the result of the measurement.

Accordingly, for example, it is possible to select an appropriate cell for the terminal device 200 when beamforming is performed.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although an example in which the communication system is a system conforming to LTE, LTE-Advanced, or a compliant communication scheme has been described, the present disclosure is not limited to such an example. For example, the communication system may be a system conforming to another communication standard.

Also, the processing steps in each process in this specification are not strictly limited to execution in a time series following the sequence described in a flowchart or a sequence diagram. For example, the processing steps in each process may be executed in a sequence that differs from a sequence described herein as a flowchart or a sequence diagram, and furthermore may be executed in parallel.

Also, it is possible to create a computer program for causing the processor (for example, a CPU, a DSP, etc.) provided in a device (for example, the base station device for the base station, or the module for the base station device, and the terminal device, or the module for the terminal device) of the present description to function as the components (for example, the information acquisition unit and the communication control unit) of the above-mentioned device (in other words, a computer program for causing the above-mentioned processor to execute the operation of the components of the above-mentioned device). Also, a recording medium recording the computer program may be provided. Also, a device (for example, a completed product or a module (a component, a processing circuit, a chip, etc.) for a completed product) including a memory that records the above-mentioned computer program and one or more processors capable of executing the above-mentioned computer program may be provided. Also, a method including the operation of the components of the above-mentioned device (for example, the information acquisition unit and the communication control unit) is included in the technology according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A device including:

an acquisition unit configured to acquire multiple weight sets for beamforming; and a control unit configured to map a reference signal for measurement to radio resources associated with a weight set in advance for each weight set included in the multiple weight sets, and multiply the reference signal by the weight set.

(2)

The device according to (1), wherein the radio resources are radio resources of a data area within a subframe including a control area and the data area.

(3)

The device according to (2), wherein the radio resources are resource elements other than resource elements for a cell-specific reference signal (CRS) among resource elements of the data area.

(4)

The device according to any one of (1) to (3), wherein the radio resources are radio resources of a specific subframe.

(5)

The device according to (4), wherein the specific subframe is an MBSFN (MBMS (Multimedia Broadcast Multicast Services) over a Single Frequency Network) subframe.

(6)

The device according to (4) or (5), wherein the control unit notifies a terminal device of the specific subframe.

(7)

The device according to (4) or (5), wherein the specific subframe is a subframe that is defined in advance.

(8)

The device according to any one of (1) to (7), wherein the control unit notifies a terminal device of radio resources associated with each of the multiple weight sets.

(9)

The device according to any one of (1) to (7), wherein the radio resources associated with each of the multiple weight sets are radio resources that are defined in advance.

(10)

The device according to any one of (1) to (9), wherein the device is a base station, a base station device for the base station, or a module for the base station device.

(11)

The device according to (10), wherein the radio resources are different from radio resources that are used by a base station adjacent to the base station in order to transmit a reference signal for measurement multiplied by a weight set for beamforming.

(12)

The device according to (11), wherein the radio resources associated with the weight set in advance are included in a same subframe as the radio resources used by the adjacent base station.

(13)

The device according to (12), wherein the radio resources associated with the weight set in advance are included in a resource block of a same band as the radio resources used by the adjacent base station.

(14)
The device according to (12),
wherein the radio resources associated with the weight set in advance are included in a resource block of a different band from the radio resources used by the adjacent base station.

(15)
The device according to (11),
wherein the radio resources associated with the weight set in advance are included in a different subframe from the radio resources used by the adjacent base station.

(16)
The device according to any one of (1) to (15),
wherein the control unit multiplies a reference signal for demodulation by a selected weight set among the multiple weight sets, and notifies a terminal device of identification information corresponding to the selected weight set.

(17)
The device according to (16),
wherein the control unit notifies the terminal device of the identification information corresponding to the selected weight set in downlink control information.

(18)
The device according to any one of (1) to (17),
wherein the multiple weight sets are weight sets for one or more subsets of multiple antenna elements included in a directional antenna available for large-scale MIMO.

(19)
The device according to (18), wherein
the multiple antenna elements are arranged in a first direction and a second direction, and
the one or more subsets include a first subset including antenna elements that are arranged in the first direction among the multiple antenna elements and a second subset including antenna elements that are arranged in the second direction among the multiple antenna elements.

(20)
The device according to (19),
wherein the control unit generates an integrated result of measurement based on a result of measurement of a reference signal multiplied by a weight set of the first subset and a result of measurement of a reference signal multiplied by a weight set of the second subset.

(21)
The device according to (18), wherein
the multiple antenna elements are arranged in a first direction and a second direction, and
the one or more subsets are subsets including antenna elements that are arranged in one of the first direction and the second direction among the multiple antenna elements.

(22)
The device according to any one of (19) to (21),
wherein the first direction and the second direction are orthogonal to each other.

(23)
The device according to any one of (1) to (17),
wherein the beamforming is large-scale MIMO beamforming.

(24)
The device according to any one of (1) to (23),
wherein the measurement is measurement of reception power or reception quality.

(25)
The device according to (24),
wherein the measurement is measurement of reference signal received power (RSRP) or reference signal received quality (RSRQ).

(26)
The device according to any one of (1) to (25),
wherein the reference signal is a cell-specific signal.

(27)
A device including:
an acquisition unit configured to acquire a result of measurement of a reference signal for measurement transmitted using radio resources associated with a weight set for each weight set included in multiple weight sets for beamforming, the reference signal being multiplied by the weight set, and
a reporting unit configured to perform measurement reporting to a base station based on the result of the measurement.

(28)
The device according to (27),
wherein the reporting unit performs measurement reporting to a base station for each weight set included in the multiple weight sets.

(29)
The device according to (27) or (28), further including
a measurement unit configured to perform the measurement for each weight set included in the multiple weight sets.

(30)
The device according to (29), wherein
the measurement unit performs measurement of a reference signal multiplied by a selected weight set among the multiple weight sets,
the reference signal multiplied by the selected weight set includes a reference signal for demodulation multiplied by the selected weight set and a reference signal for measurement transmitted using radio resources associated with the selected weight set, the reference signal for measurement being multiplied by the selected weight set, and
identification information corresponding to the selected weight set is information of which a base station notifies a terminal device.

(31)
The device according to any one of (27) to (30), wherein
the multiple weight sets are weight sets for one or more subsets of multiple antenna elements included in a directional antenna available for large-scale MIMO,
the multiple antenna elements are arranged in a first direction and a second direction,
the one or more subsets include a first subset including antenna elements that are arranged in the first direction among the multiple antenna elements and a second subset including antenna elements that are arranged in the second direction among the multiple antenna elements, and
the reporting unit generates an integrated result of measurement based on a result of measurement of a reference signal multiplied by a weight set of the first subset and a result of measurement of a reference signal multiplied by a weight set of the second subset, and performs measurement reporting to a base station based on the integrated result of measurement.

(32)
The device according to any one of (27) to (31),
wherein the device is a terminal device or a module for the terminal device.

(33)
A method including:
acquiring multiple weight sets for beamforming; and
mapping, by a processor, a reference signal for measurement to radio resources associated with a weight set in advance for each weight set included in the multiple weight sets, and multiplying the reference signal by the weight set.
(34)
A program for causing a processor to execute:
acquiring multiple weight sets for beamforming; and
mapping a reference signal for measurement to radio resources associated with a weight set in advance for each weight set included in the multiple weight sets, and multiplying the reference signal by the weight set.
(35)
A readable recording medium having a program stored therein, the program causing a processor to execute:
acquiring multiple weight sets for beamforming; and
mapping a reference signal for measurement to radio resources associated with a weight set in advance for each weight set included in the multiple weight sets, and multiplying the reference signal by the weight set.
(36)
A method including:
acquiring a result of measurement of a reference signal for measurement transmitted using radio resources associated with a weight set for each weight set included in multiple weight sets for beamforming, the reference signal being multiplied by the weight set, and
performing, by a processor, measurement reporting to a base station based on the result of the measurement.
(37)
A program for causing a processor to execute:
acquiring a result of measurement of a reference signal for measurement transmitted using radio resources associated with a weight set for each weight set included in multiple weight sets for beamforming, the reference signal being multiplied by the weight set, and
performing measurement reporting to a base station based on the result of the measurement.
(37)
A readable recording medium having a program stored therein, the program causing a processor to execute:
acquiring a result of measurement of a reference signal for measurement transmitted using radio resources associated with a weight set for each weight set included in multiple weight sets for beamforming, the reference signal being multiplied by the weight set, and
performing measurement reporting to a base station based on the result of the measurement.

REFERENCE SIGNS LIST 1 communication system
30 subframe
31 control area
33 data area
51 first direction
53 second direction
100 base station
101 directional antenna
103 antenna element
105 first subset
107 second subset
151 information acquisition unit
153 communication control unit
200 terminal device
241 measurement unit
243 information acquisition unit
245 reporting unit
247 communication control unit

The invention claimed is:
1. A device comprising:
circuitry including at least a processor and a memory, the circuitry configured to:
acquire multiple weight sets for beamforming;
map a reference signal for measurement to radio resources associated with a weight set in advance for each weight set included in the multiple weight sets;
multiply the reference signal by the weight set;
select or reselect a cell based on measurements made of the reference signal multiplied by the weight set; and
wherein the radio resources are resource elements other than resource elements for either a cell-specific reference signal (CRS) or a channel state information reference signal (CSI-RS) among resource elements of a data area within a subframe that includes a control area and the data area.
2. The device according to claim 1,
wherein the radio resources are radio resources of a specific subframe.
3. The device according to claim 2,
wherein the specific subframe is an MBSFN (MBMS (Multimedia Broadcast Multicast Services) over a Single Frequency Network) subframe.
4. The device according to claim 2,
wherein the circuitry is further configured to notify a terminal device of the specific subframe.
5. The device according to claim 2,
wherein the specific subframe is a subframe that is defined in advance.
6. The device according to claim 1,
wherein the circuitry is further configured to notify a terminal device of radio resources associated with each of the multiple weight sets.
7. The device according to claim 1,
wherein the radio resources associated with each of the multiple weight sets are radio resources that are defined in advance.
8. The device according to claim 1,
wherein the device is a base station, a base station device for the base station, or a module for the base station device.
9. The device according to claim 8,
wherein the radio resources are different from radio resources that are used by a base station adjacent to the base station in order to transmit a reference signal for measurement multiplied by a weight set for beamforming.
10. The device according to claim 9,
wherein the radio resources associated with the weight set in advance are included in a same subframe as the radio resources used by the adjacent base station.
11. The device according to claim 10,
wherein the radio resources associated with the weight set in advance are included in a resource block of a same band as the radio resources used by the adjacent base station.
12. The device according to claim 10,
wherein the radio resources associated with the weight set in advance are included in a resource block of a different band from the radio resources used by the adjacent base station.
13. The device according to claim 9,
wherein the radio resources associated with the weight set in advance are included in a different subframe from the radio resources used by the adjacent base station.

14. The device according to claim 1,
wherein the circuitry is further configured to multiply a reference signal for demodulation by a selected weight set among the multiple weight sets, and notify a terminal device of identification information corresponding to the selected weight set.

15. The device according to claim 14, wherein the circuitry is further configured to notify the terminal device of the identification information corresponding to the selected weight set in downlink control information.

16. The device according to claim 1,
wherein the multiple weight sets are weight sets for one or more subsets of multiple antennas included in a directional antenna available for large-scale MIMO.

17. The device according to claim 16, wherein
the multiple antennas are arranged in a first direction and a second direction, and
the one or more subsets include a first subset including antennas that are arranged in the first direction among the multiple antennas and a second subset including antennas that are arranged in the second direction among the multiple antennas.

18. The device according to claim 17,
wherein the circuitry is further configured to generate an integrated result of measurement based on a result of measurement of a reference signal multiplied by a weight set of the first subset and a result of measurement of a reference signal multiplied by a weight set of the second subset.

19. The device according to claim 16, wherein
the multiple antennas are arranged in a first direction and a second direction, and
the one or more subsets are subsets including antennas that are arranged in one of the first direction and the second direction among the multiple antennas.

20. The device according to claim 17,
wherein the first direction and the second direction are orthogonal to each other.

21. The device according to claim 1,
wherein the beamforming is large-scale MIMO beamforming.

22. The device according to claim 1,
wherein the measurement is measurement of reception power or reception quality.

23. The device according to claim 22,
wherein the measurement is measurement of reference signal received power (RSRP) or reference signal received quality (RSRQ).

24. The device according to claim 1,
wherein the reference signal is a cell-specific signal.

25. A device comprising:
circuitry including at least a processor and a memory, the circuitry configured to:
acquire a result of measurement of a reference signal for measurement transmitted using radio resources associated with a weight set for each weight set included in multiple weight sets for beamforming, the reference signal being multiplied by the weight set;
perform measurement reporting to a base station based on the result of the measurement, wherein the measurement reporting provides a basis for cell selection or cell reselection; and
wherein the radio resources are resource elements other than resource elements for either a cell-specific reference signal (CRS) or a channel state information reference signal (CSI-RS) among resource elements of a data area within a subframe that includes a control area and the data area.

26. The device according to claim 25,
wherein the circuitry is further configured to perform measurement reporting to a base station for each weight set included in the multiple weight sets.

27. The device according to claim 25, wherein the circuitry is further configured to perform the measurement for each weight set included in the multiple weight sets.

28. The device according to claim 27, wherein the circuitry is further configured to perform measurement of a reference signal multiplied by a selected weight set among the multiple weight sets,
the reference signal multiplied by the selected weight set includes a reference signal for demodulation multiplied by the selected weight set and a reference signal for measurement transmitted using radio resources associated with the selected weight set, the reference signal for measurement being multiplied by the selected weight set, and
identification information corresponding to the selected weight set is information of which a base station notifies a terminal device.

29. The device according to claim 25, wherein
the multiple weight sets are weight sets for one or more subsets of multiple antennas included in a directional antenna available for large-scale MIMO,
the multiple antennas are arranged in a first direction and a second direction,
the one or more subsets include a first subset including antennas that are arranged in the first direction among the multiple antennas and a second subset including antennas that are arranged in the second direction among the multiple antennas, and
the circuitry is further configured to generate an integrated result of measurement based on a result of measurement of a reference signal multiplied by a weight set of the first subset and a result of measurement of a reference signal multiplied by a weight set of the second subset, and perform measurement reporting to a base station based on the integrated result of measurement.

30. The device according to claim 25, wherein the device is a terminal device or a module for the terminal device.

* * * * *